United States Patent
Cho et al.

(10) Patent No.: US 10,735,943 B2
(45) Date of Patent: Aug. 4, 2020

(54) METHOD FOR TRANSMITTING AND RECEIVING DATA USING MULTIPLE COMMUNICATION DEVICES IN WIRELESS COMMUNICATION SYSTEM, AND DEVICE SUPPORTING SAME

(71) Applicant: LG ELECTRONICS INC., Seoul (KR)

(72) Inventors: Heejeong Cho, Seoul (KR); Jiwon Kang, Seoul (KR); Heejin Kim, Seoul (KR); Ilmu Byun, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

(21) Appl. No.: 16/077,423

(22) PCT Filed: Feb. 10, 2017

(86) PCT No.: PCT/KR2017/001445
§ 371 (c)(1),
(2) Date: Aug. 10, 2018

(87) PCT Pub. No.: WO2017/138757
PCT Pub. Date: Aug. 17, 2017

(65) Prior Publication Data
US 2019/0053306 A1    Feb. 14, 2019

Related U.S. Application Data

(60) Provisional application No. 62/293,774, filed on Feb. 11, 2016, provisional application No. 62/305,541,
(Continued)

(51) Int. Cl.
*H04W 76/14*     (2018.01)
*H04L 29/12*     (2006.01)
(Continued)

(52) U.S. Cl.
CPC ........... *H04W 8/08* (2013.01); *H04L 61/2503* (2013.01); *H04W 76/11* (2018.02); *H04W 76/14* (2018.02);
(Continued)

(58) Field of Classification Search
CPC ........... H04W 8/04; H04W 8/06; H04W 8/08; H04W 8/20; H04W 8/26; H04W 28/02;
(Continued)

(56) References Cited

U.S. PATENT DOCUMENTS 8,917,662 B2 *   12/2014   Kim ...................... H04W 28/08
                                                                 370/328
9,572,134 B2 *   2/2017   Zembutsu ............. H04W 76/10
(Continued)

FOREIGN PATENT DOCUMENTS

KR    1020130007198       1/2013
KR    1020150016152       2/2015
(Continued)

OTHER PUBLICATIONS

PCT International Application No. PCT/KR2017/001481, International Search Report dated Jun. 20, 2017, 12 pages.
(Continued)

*Primary Examiner* — Tri H Phan
(74) *Attorney, Agent, or Firm* — Lee, Hong, Degerman, Kang & Waimey PC

(57) ABSTRACT

The present specification relates to a method for transmitting and receiving data using multiple communication devices included in a single wireless device in a wireless communication system, the method being performed by a first network entity and comprising the steps of: receiving, from one or more communication devices, a connectivity request message for requesting a connection to a core network for transmitting and receiving data; ascertaining, on the basis of
(Continued)

the received connectivity request message, whether a second communication device linked to a first communication device exists; and if the second communication device linked to the first communication device exists, confirming whether the linked second communication device has requested creation of a bearer associated with a first identifier or has a bearer created for the first identifier.

17 Claims, 15 Drawing Sheets

Related U.S. Application Data filed on Mar. 9, 2016, provisional application No. 62/351,278, filed on Jun. 16, 2016, provisional application No. 62/353,035, filed on Jun. 22, 2016.

(51) Int. Cl.
| | |
|---|---|
| *H04W 76/11* | (2018.01) |
| *H04W 88/04* | (2009.01) |
| *H04W 88/16* | (2009.01) |
| *H04W 8/08* | (2009.01) |
| *H04W 8/04* | (2009.01) |
| *H04W 8/26* | (2009.01) |
| *H04W 60/04* | (2009.01) |
| *H04W 8/06* | (2009.01) |
| *H04W 8/20* | (2009.01) |

(52) U.S. Cl.
CPC ........... *H04W 88/04* (2013.01); *H04L 61/103* (2013.01); *H04L 61/2007* (2013.01); *H04L 61/6022* (2013.01); *H04W 8/04* (2013.01); *H04W 8/06* (2013.01); *H04W 8/20* (2013.01); *H04W 8/26* (2013.01); *H04W 60/04* (2013.01); *H04W 88/16* (2013.01)

(58) Field of Classification Search
CPC ..... H04W 60/00; H04W 60/04; H04W 76/02; H04W 76/04; H04W 76/11; H04W 76/14; H04W 80/10; H04W 88/04; H04W 88/16; H04L 29/12; H04L 61/103; H04L 61/2007; H04L 61/2503; H04L 61/6022
See application file for complete search history.

(56) References Cited

U.S. PATENT DOCUMENTS

| | | | |
|---|---|---|---|
| 9,692,567 | B1 | 6/2017 | Vaidya et al. |
| 9,913,242 | B1 | 3/2018 | Saleh et al. |
| 10,440,556 | B2 * | 10/2019 | Cho .................... H04L 61/2503 |
| 2007/0293249 | A1 | 12/2007 | Wang |
| 2010/0056175 | A1 | 3/2010 | Bachmann et al. |
| 2010/0278108 | A1 * | 11/2010 | Cho ...................... H04W 76/12 |
| | | | 370/328 |
| 2011/0116449 | A1 | 5/2011 | Hu et al. |
| 2012/0063430 | A1 | 3/2012 | Suh et al. |
| 2012/0196599 | A1 | 8/2012 | Cho et al. |
| 2013/0121282 | A1 | 5/2013 | Liu |
| 2013/0155948 | A1 | 6/2013 | Pinheiro et al. |
| 2014/0115187 | A1 | 4/2014 | Li et al. |
| 2015/0103665 | A1 * | 4/2015 | Kaippallimalil .. H04W 36/0011 |
| | | | 370/235 |
| 2015/0223284 | A1 | 8/2015 | Jain et al. |
| 2016/0095036 | A1 | 3/2016 | Stojanovski et al. |
| 2017/0006503 | A1 | 1/2017 | Panaitopol et al. |
| 2017/0150467 | A1 | 5/2017 | Tamura et al. |
| 2017/0201937 | A1 | 7/2017 | Zhang et al. |
| 2017/0238223 | A1 | 8/2017 | Zhou et al. |

FOREIGN PATENT DOCUMENTS

| | | |
|---|---|---|
| WO | 2015115862 | 1/2015 |
| WO | 2015031171 | 3/2015 |
| WO | 2015050402 | 4/2015 |
| WO | 2015174803 | 11/2015 |

OTHER PUBLICATIONS

U.S. Appl. No. 16/077,446, Notice of Allowance dated May 10, 2019, 16 pages.
PCT International Application No. PCT/KR2017/001445, International Search Report dated May 19, 2017, 4 pages.
3rd Generation Partnership Project (3GPP), "Technical Specification Group Services and System Aspects; General Packet Radio Service (GPRS) enhancements for Evolved Universal Terrestrial Radio Access Network (E-UTRAN) access (Release 13)," 3GPP TS 23.401 V13.5.0, Dec. 2015, 339 pages.

* cited by examiner

FIG. 9
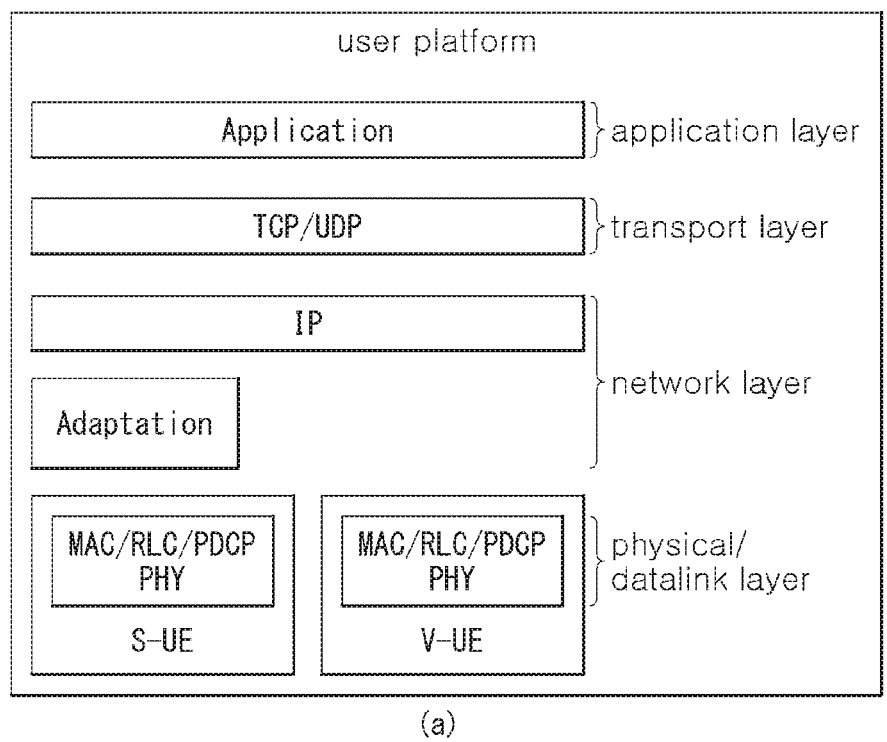
(a)
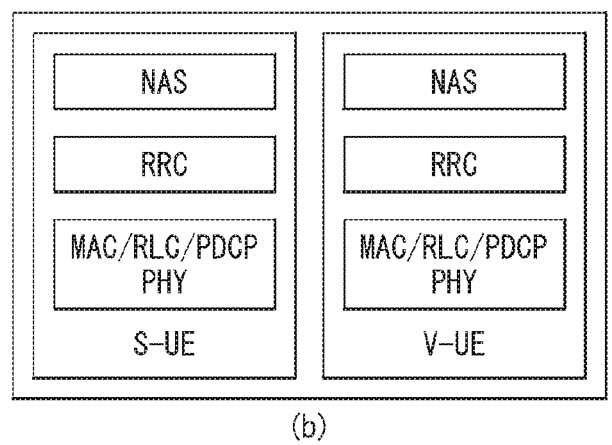
(b)

METHOD FOR TRANSMITTING AND RECEIVING DATA USING MULTIPLE COMMUNICATION DEVICES IN WIRELESS COMMUNICATION SYSTEM, AND DEVICE SUPPORTING SAME

CROSS-REFERENCE TO RELATED APPLICATIONS

This application is the National Stage filing under 35 U.S.C. 371 of International Application No. PCT/KR2017/001445, filed on Feb. 10, 2017, which claims the benefit of U.S. Provisional Application No. 62/293,774, filed on Feb. 11, 2016, 62/305,541, filed on Mar. 9, 2016, 62/351,278, filed on Jun. 16, 2016, and 62/353,035, filed on Jun. 22, 2016, the contents of which are all hereby incorporated by reference herein in their entirety.

TECHNICAL FIELD

The present invention relates to a method for transmitting and receiving data in a wireless communication system, and, more particularly, relates to a method for transmitting and receiving data using multiple communication devices in a wireless communication system, and a device for supporting the same.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Purpose

The present disclosure has a purpose to provide a method for establishing multiple paths for data boosting using multiple communication devices included in one wireless device.

To this end, the present disclosure has a purpose to provide a new method for defining signaling between core network entities to allocate the same IP address to the multiple communication devices.

The technical purposes which the present disclosure is intended for are not limited to the technical purposes set forth above. Other technical purposes not mentioned may be clearly understood by those skilled in the art to which the present invention belongs from the following description.

Technical Solutions

In one aspect of the present invention, there is provided a method for transmitting and receiving data using a plurality of communication devices included in a single wireless device in a wireless communication system, wherein the method is performed by a first network entity, wherein the method comprises: receiving from one or more communication device a connectivity request message for requesting an attach to a core network for transmission and reception of the data, wherein the connectivity request message includes at least one of: a first identifier identifying the core network with which the attach is requested; a second identifier identifying a second communication device linked to a first communication device transmitting the connectivity request message; or a third identifier identifying the first network entity managing the first communication device; determining based on the received connectivity request message whether there is the second communication device linked to the first communication device; and when there is the second communication device linked to the first communication device, determining: whether the linked second communication device has requested creation of a bearer associated with the first identifier; or whether the linked second communication device keeps a bearer already created for the first identifier.

In one embodiment of the method, the method further comprises: transmitting a session creation request message to a second network entity to create a session associated with the first identifier; receiving a session creation response message from the second network entity in response to the session creation request message; and performing a bearer context activation procedure with the one or more communication device.

In one embodiment of the method, transmitting the session creation request message to the second network entity includes: transmitting a first session creation request message associated with the first communication device to the second network entity; and transmitting a second session creation request message associated with the second communication device to the second network entity.

In one embodiment of the method, receiving the session creation response message from the second network entity includes: receiving a first session response message to the first session creation request message from the second network entity; and receiving a second session response message to the second session creation request message from the second network entity.

In one embodiment of the method, the method further comprises: upon when the linked second communication device has not requested the creation of the bearer associated with the first identifier; or when the linked second communication device does not keep the bearer already created for the first identifier, transmitting a control message informing the receipt of the connectivity request message to a third network entity managing the linked second communication device.

In one embodiment of the method, the control message includes at least one of: the first identifier; the second identifier; a fourth identifier identifying a communication device managed by the first network entity; or action type information indicating that the control message is intended to inform the reception of the connectivity request message.

In one embodiment of the method, the method further comprises receiving a response message to the control message from the third network entity.

In one embodiment of the method, the method further comprises: when the first network entity receives the first session creation response message from the second network entity, transmitting, to the third network entity, bearer-related information configured for the first communication device and the first identifier.

In one embodiment of the method, the bearer-related information includes at least one of: a bearer identifier identifying a bearer configured for the first communication device; an IP address assigned to the first communication device; or an IP address of a P-GW (PDN gateway).

In one embodiment of the method, the method further comprises: when the first network entity receives a response message to the control message from the third network entity, determining a priority of a session establishment request for the first identifier based on the received response message.

In one embodiment of the method, determining the priority includes comparing a identifier of the third network entity contained in the received response message with the identifier of the first network entity, wherein the priority of the session establishment request is determined to be small or large in the identifiers of the network entities.

In one embodiment of the method, the first communication device is a communication device to perform a first attach to the core network among the communication devices included in the wireless device; wherein the second communication device is a communication device to perform a subsequent attach to the core network after the first attach among the communication devices included in the wireless device.

In one embodiment of the method, the first communication device is in a connected state, wherein the second communication device is in a connected state or idle state, wherein the first network entity is in a connected state.

In one embodiment of the method, the first communication device and the second communication device share a single application layer, a single transport layer, and a single network layer.

In one embodiment of the method, the first network entity is a mobile management entity (MME), wherein the second network entity is a gateway (GW).

In one embodiment of the method, the core network is an application packet network (APN).

In another aspect of the present invention, three is provided a first network entity for transmitting and receiving data using a plurality of communication devices included in a single wireless device in a wireless communication system, wherein the first network entity comprises: a transmission and reception unit configured for transmitting and receiving a radio signal; and a processor functionally connected to the transmission and reception unit, wherein the processor is configured for: receiving from one or more communication device a connectivity request message for requesting an attach to a core network for transmission and reception of the data, wherein the connectivity request message includes at least one of: a first identifier identifying the core network with which the attach is requested; a second identifier identifying a second communication device linked to a first communication device transmitting the connectivity request message; or a third identifier identifying the first network entity managing the first communication device; determining based on the received connectivity request message whether there is the second communication device linked to the first communication device; and when there is the second communication device linked to the first communication device, determining: whether the linked second communication device has requested creation of a bearer associated with the first identifier; or whether the linked second communication device keeps a bearer already created for the first identifier.

Advantageous Effects

The present disclosure allocates the same IP address to multiple communication devices included in one wireless device, and newly defines signaling between core network entities to form multiple paths in the PDN connection creation procedure, thereby increasing the data transmission rate.

The effects that may be obtained from the present disclosure are not limited to the effects mentioned above. Other effects not mentioned may be clearly understood by those skilled in the art to which the present invention belongs from the following description

DESCRIPTION OF DRAWINGS

FIG. 9 is a block diagram of one example of a radio protocol architecture of a user platform to which the present invention may be applied.

FIG. 14 is a flow chart showing still another example of a method for configuring multi-paths for data boosting using multiple user equipments as proposed in accordance with the present disclosure.

MODE FOR INVENTION

Figure 1:
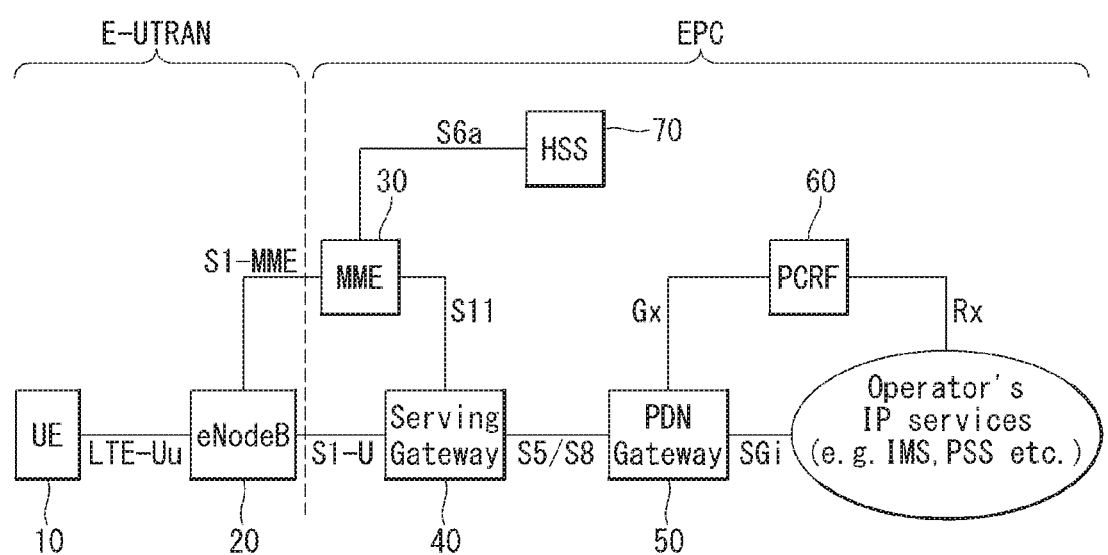
FIG. 1 shows one example of Evolved Packet System (EPS) related to a LTE system to which the present invention may be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the present disclosure, a base station has a meaning of a user equipment node of a network, which directly communicates with a user equipment. In some cases, a specific operation described as being performed by the base station may also be performed by an upper node of the base station. Namely, it is apparent that, in a network including a plurality of network nodes including a base station, various operations performed for communication with a user equipment may be performed by the base station, or network nodes other than the base station. The term 'base station (BS)' may be replaced by the term 'fixed station', 'Node B', 'evolved-NodeB (eNB)', 'base transceiver system (BTS)', 'access point (AP)', and the like. The term 'user equipment" may be fixed or mobile, and may be replaced with the term 'user equipment (UE)', 'mobile station (MS)', 'user user equipment (UT)', 'mobile subscriber station (MSS)', 'subscriber station (SS)', 'advanced mobile station (AMS)', 'wireless user equipment (WT)', 'machine-type communication (MTC) device', 'machine-to-machine (M2M) device', 'device-to-device (D2D) device', and the like.

Hereinafter, the downlink (DL) means communication from a base station to a user equipment, and the uplink (UL) means communication from a user equipment to a base station. In the downlink, a transmitter may be part of a base station, and a receiver may be part of a user equipment. In the uplink, a transmitter may be part of a user equipment, and the receiver may be part of a base station.

Specific terms described in the following description are provided to help understanding of the present invention, and the use of such specific terms may be changed in other forms without departing the technical spirit of the present invention.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA, and adopts OFDMA in the downlink and adopts SC-FDMA in the uplink. LTE-advanced (A) is the evolution of 3GPP LTE.

Embodiments of the present invention may be supported by at least one standard document which is described in IEEE 802, 3GPP and 3GPP2, which are wireless access systems. That is, among the embodiments of the present invention, steps or parts that are not described for disclosing the technical concept of the present invention apparently may be supported by the documents. In addition, all terms disclosed in this document may be described by the standard document.

For clear description, the present invention is described mainly for 3GPP LTE/LTE-A, but the technical features of the present invention are not limited thereto, but may also be applied to 5G system.

Before describing with reference to drawings, for understanding the present invention, the terms used in the present disclosure are briefly defined.

EPS: This is an abbreviation of Evolved Packet System, and means a core network that supports Long Term Evolution (LTE) network. This is a network in the form evolved from UMTS.

PDN (Public Data Network): An independent network at which a server that provides a service is located.

APN (Access Point Name): This is a name of an access point managed in a network, and provided to a UE. That is, this indicates a name (a character string) of the PDN. Based on the name of an access point, the corresponding PDN for transmitting and receiving data is determined.

TEID (Tunnel Endpoint Identifier): This is an End point ID of a tunnel configured between nodes in a network, and configured in each section as a unit of bearer of each UE.

MME: This is an abbreviation of Mobility Management Entity, and plays the role of controlling each entity in the EPS in order to provide a session and mobility for a UE.

Session: A session is a passage for transmitting data, and the unit may be a unit of PDN, Bearer, IP flow, and so on.

A difference of each unit may be distinguished by a target network entire unit (a unit of APN or PDN), a unit distinguished by QoS therein (a unit of Bearer) and a unit of destination IP address as defined in 3GPP.

EPS Bearer: A logical path generated between a UE and a gateway through which various types of traffics are transmitted and received.

Default EPS Bear: This is a logical path for transmitting and receiving data which is generated basically when a UE accesses to a network, and may be maintained until the UE is detached from the network.

Dedicated EPS Bearer: A logical path generated for being provided with a service additionally after the Default EPS Bear is generated, if it is required.

IP flow: Various types of traffics transmitted and received through a logical path between a UE and a gateway.

Service Data Flow (SDF): IP flow of a user traffic or combination of a plurality of IP flows which is classified according to a service type.

PDN connection: This represents an association (connection) between a UE represented by an IP address and the PDN represented by the APN. This means a connection (UE-PDN GW) between entities in a core network so as to form a session.

UE Context: State information of a UE used for managing the UE in a network, that is, state information including UE ID, mobility (current location, etc.), an attribute of a session (QoS, priority, etc.)

TIN: Temporary Identity used in Next update
P-TMSI: Packet Temporary Mobile Subscriber
TAU: Tracking Area Update
GBR: Guaranteed Bit Rate
GTP: GPRS Tunneling Protocol
TEID: Tunnel Endpoint ID
GUTI: Globally Unique Temporary Identity, UE identity known to an MME FIG. 1 is a view illustrating an Evolved Packet System which is associated with the Long Term Evolution (LTE) system to which the present invention can be applied.

The LTE system aims to provide seamless Internet Protocol (IP) connectivity between a user equipment (UE) 10 and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station 20, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also called a home location register (HLR), and includes an EPS-subscribed QoS profile and SAE subscription data including access control information for roaming. Furthermore, the HSS also includes information about a PDN accessed by a user. Such information may be maintained in an access point name (APN) form. The APN is a domain name system (DNS)-based label, and is an identity scheme that describes an access point for a PDN or a PDN address indicative of a subscribed IP address.

As shown in FIG. 1, various interfaces, such as S1-U, S1-MME, S5S8, S11, S6a, Gx, Rx and SG, may be defined between EPS network elements.

Hereinafter, the concept of mobility management (MM) and an MM back-off timer are described in detail. The mobility management (MM) is a procedure for reducing overhead on the E-UTRAN and processing in a UE.

If the mobility management (MM) is applied, all of pieces of information related to a UE in an access network may be released during the cycle in which data is deactivated. The MME may maintain UE context and information related to a configured bearer during an Idle interval.

A UE may notify a network of a new location whenever it deviates from a current tracking area (TA) so that the network may contact the UE in the ECM-IDLE state. Such a procedure may be called "Tracking Area Update." This procedure may be called "Routing Area Update" in a universal terrestrial radio access network (UTRAN) or GSM EDGE radio access network (GERAN) system. The MME performs a function for tracking a user location while a UE is in the ECM-IDLE state.

If downlink data to be delivered to a UE in the ECM-IDLE state is present, the MME transmits a paging message to all of eNodeB on a tracking area (TA) with which the UE has been registered.

Next, the base station starts paging for the UE on a radio interface. When the paging message is received, the base station performs a procedure that enables the state of the UE to switch to the ECM-CONNECTED state. Such a procedure may be called a "Service Request Procedure." Accordingly, information related to the UE is generated in the E-UTRAN, and all of bearers are re-established. The MME performs the re-establishment of the radio bearers and a function of updating UE context on the base station.

If the mobility management (MM) procedure is performed, a mobility management (MM) backoff timer may be additionally used. Specifically, the UE may transmit tracking area update (TAU) in order to update the TA. The MME may reject a TAU request due to core network congestion. In this case, the MME may provide a time value related to the MM backoff timer. When the corresponding time value is received, the UE may activate the MM backoff timer.

Figure 2:
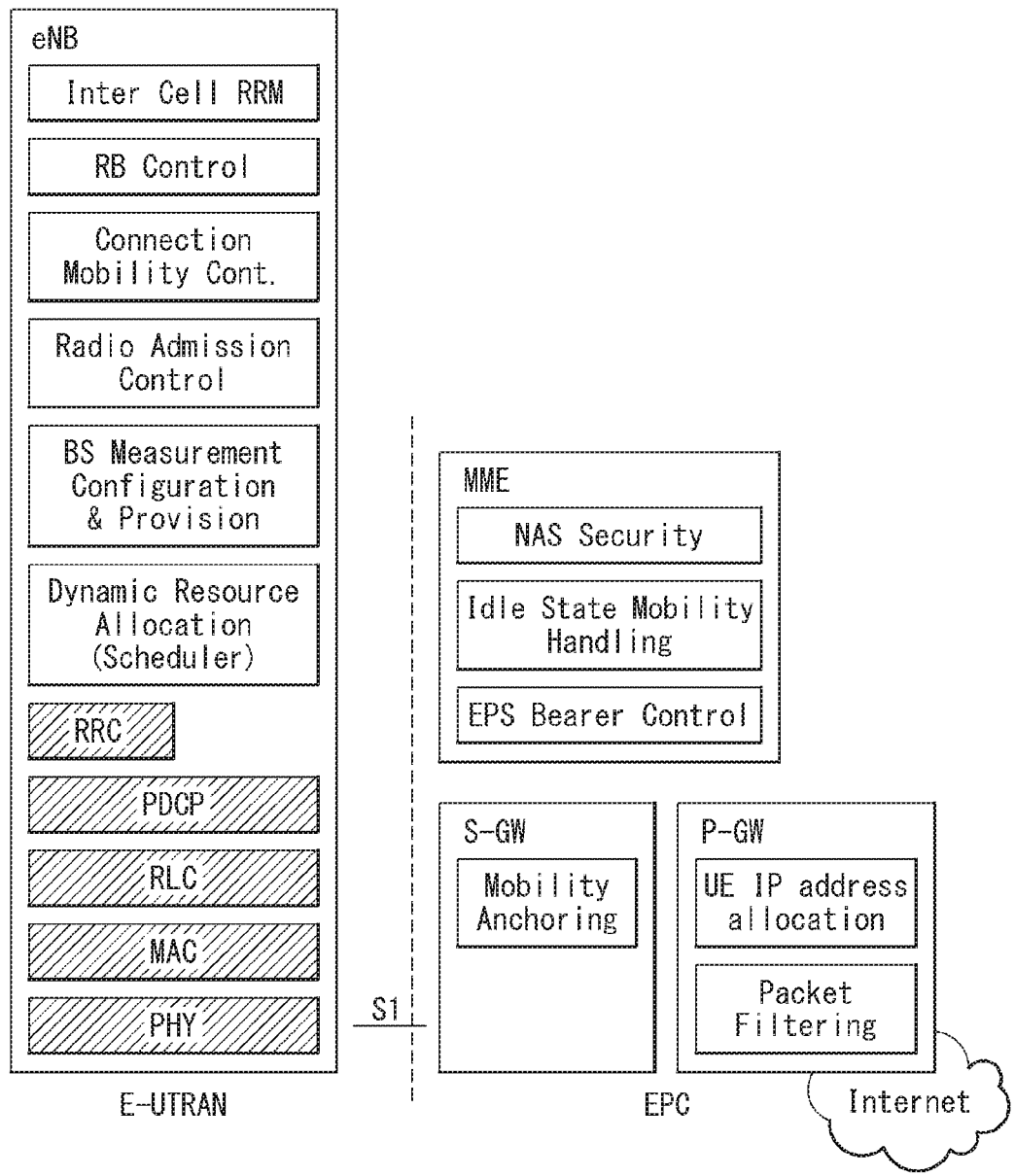
FIG. 2 is a block diagram of functional splitting between E-UTRAN and EPC to which the present invention may be applied.

FIG. 2 illustrates a functional split of an E-UTRAN and an EPC to which the present invention can be applied.

Referring to FIG. 2, a deviate crease line block indicates radio protocol layer, and an empty block indicates the functional entity of a control plane.

A base station performs the following function. (1) radio resource management (RRM) functions, such as radio bearer control, radio admission control, connection mobility control, and dynamic resource allocation to a user equipment, (2) Internet protocol (IP) header compression and the encryption of a user data stream, (3) the routing of user plane data toward an S-GW, (4) the scheduling and transmission of a paging message, (5) the scheduling and transmission of broadcast information, and (6) measurement for mobility and scheduling and a measurement report configuration.

The MME performs the following functions. (1) the distribution of a paging message to base stations, (2) security control, (3) idle state mobility control, (4) SAE bearer control, and (5) the ciphering and integrity protection of non-access stratum (NAS) signaling.

The S-GW performs the following functions. (1) the termination of a user plane packet for paging and (2) user plane switching for the support of user equipment mobility.

Figure 3:
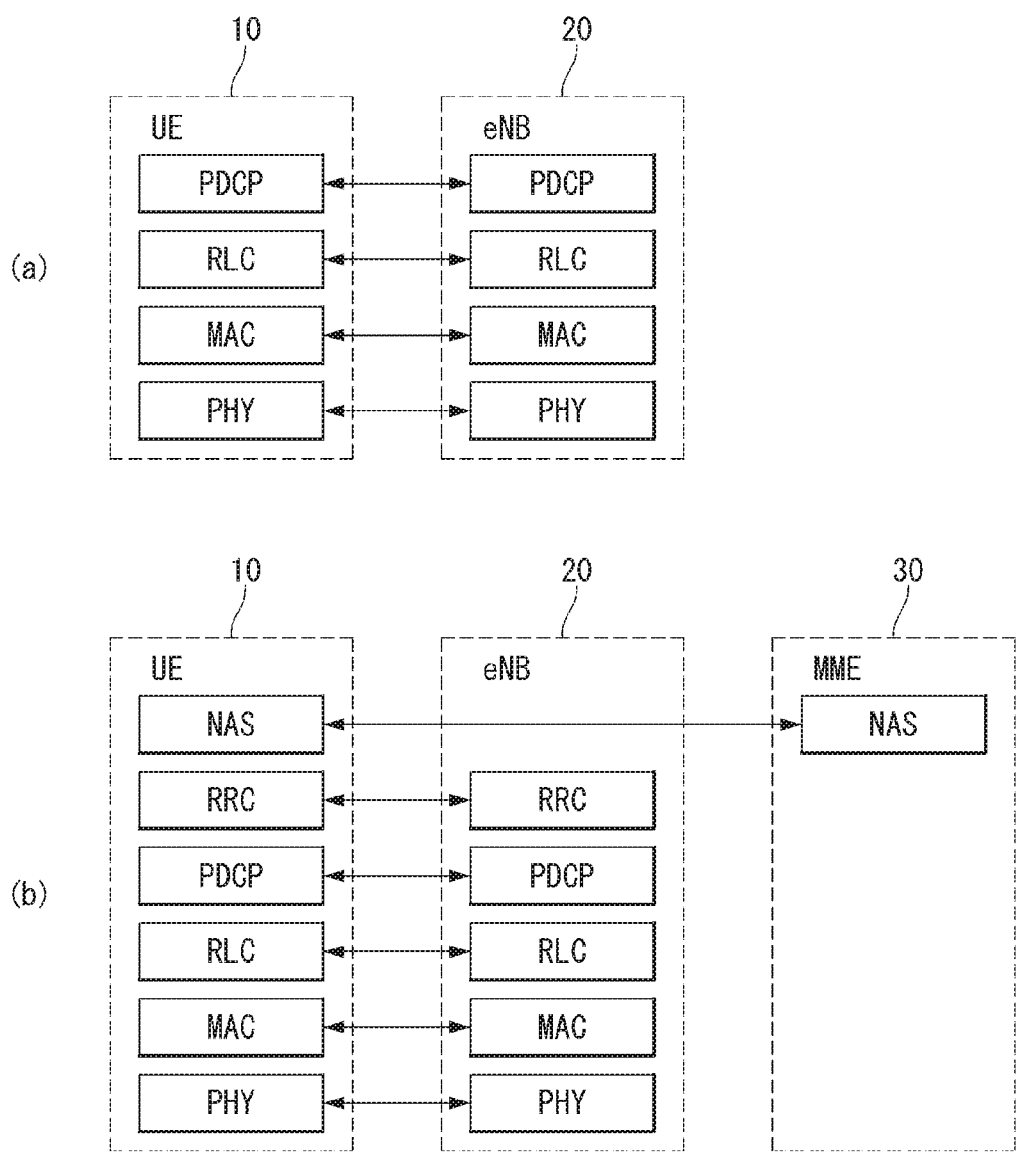
FIG. 3 is a block diagram of one example of a radio protocol architecture to which technical features of the invention may be applied.

FIG. 3 is a block diagram showing an example of radio protocol architecture to which the technical characteristics of the present invention may be applied.

FIG. 3(a) shows an example of radio protocol architecture for a user plane, and FIG. 3(b) is a block diagram showing an example of radio protocol architecture for a control plane.

The user plane is a protocol stack for user data transmission, and the control plane is a protocol stack for control signal transmission.

Referring to FIGS. 3(a) and 3(b), a physical (PHY) layer provides information transfer service to a higher layer using a physical channel. The physical layer is connected to a medium access control (MAC) layer, that is, a higher layer, through a transport channel. Data is moved between the MAC layer and the physical layer through the transport channel. The transport channel is classified depending on how data is transmitted through a radio interface according to which characteristics.

Data is moved through a physical channel between different physical layers, that is, the physical layers of a transmitter and a receiver. The physical channel may be modulated according to an orthogonal frequency division multiplexing (OFDM) scheme, and uses time and a frequency as radio resources.

The function of the MAC layer includes mapping between a logical channel and a transport channel and multiplexing/demultiplexing (the meaning of "/" includes both the concepts of "or" and "and") to a transport block provided to a physical channel on the transport channel of an MAC service data unit (SDU) that belongs to a logical channel. The MAC layer provides service to a radio link control (RLC) layer through the logical channel The function of the RLC layer includes the concatenation, segmentation and reassembly of an RLC SDU. In order to guarantee various quality of services (QoS) required by a radio bearer (RB), the RLC layer provides three operating modes; a transparent mode (TM), an unacknowledged mode (UM) and an acknowledged mode (AM). AM RLC provides error correction through an automatic repeat request (ARQ).

A radio resource control (RRC) layer is defined only in the control plane. The RRC layer is related to the configuration, re-configuration and release of radio bearers and is responsible for control of the logical channel, transport channel and physical channels. An RB means a logical path provided by the first layer (PHY layer) and the second layer (MAC layer, RLC layer, and PDCP layer) for the transfer of data between a user equipment and a network.

The function of a packet data convergence protocol (PDCP) layer in the user plane includes the transfer, header compression and ciphering of user data. The function of a packet data convergence protocol (PDCP) in the control plane includes the transfer and ciphering/integrity protection of control plane data.

What an RB is configured means a process of defining the characteristics of a radio protocol layer and channel in order to provide a specific service and configuring each detailed parameter and operating method. An RB may be divided into two types of a signaling RB (SRB) and a data RB (DRB). The SRB is used as a passage for transmitting an RRC message in the control plane, and the DRB is used as a passage for transmitting user data in the user plane.

When an RRC connection is established between the RRC layer of a user equipment and the RRC layer of an E-UTRAN, the user equipment is in the RRC connected state. If not, the user equipment is in the RRC idle state.

A downlink transport channel through which a network transmits data to a user equipment includes a broadcast channel (BCH) through which system information is transmitted and a downlink shared channel (SCH) through which user traffic or a control message is transmitted. The traffic of a downlink multicast or broadcast service or a control message may be transmitted through a downlink SCH or may be transmitted through a separate downlink multicast channel (MCH). Meanwhile, an uplink the transport channel through a user equipment transmits data to a network includes a random access channel (RACH) through which an initial control message is transmitted and an uplink shared channel (SCH) through which user traffic or a control message is transmitted.

A logical channel located higher than a transport channel and mapped to the transport channel includes a broadcast control channel (BCCH), a paging control channel (PCCH), a common control channel (CCCH), a multicast control channel (MCCH), and a multicast traffic channel (MTCH).

A physical channel includes several OFDM symbols in the time domain and several subcarriers in the frequency domain. One subframe includes a plurality of OFDM symbols in the time domain. A resource block is a resource allocation unit and consists of a plurality of OFDM symbols and a plurality of subcarriers. Furthermore, each subframe may use specific subcarriers of specific OFDM symbols (e.g., first OFDM symbol) of the corresponding subframe for a physical downlink control channel (PDCCH), that is, an L1/L2 control channel A transmission time interval (TTI) is a unit time of subframe transmission.

Figure 4:
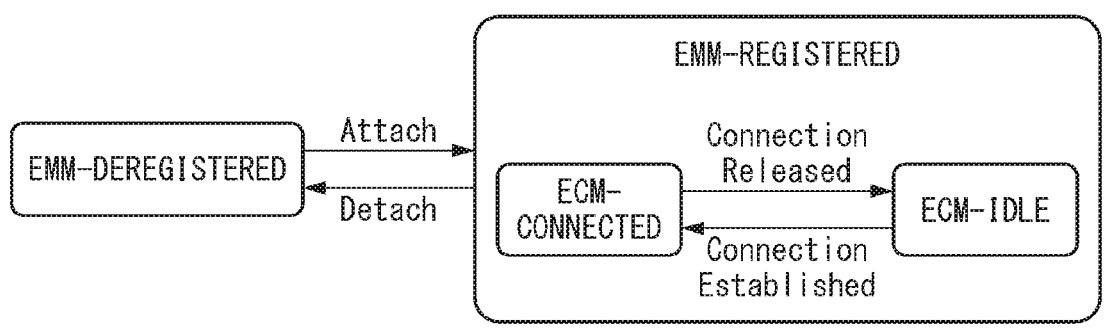
FIG. 4 illustrates EMM and ECM states in a wireless communication system to which the present invention may be applied.

FIG. 4 is a diagram illustrating EMM and an ECM state in a wireless communication system to which the present invention may be applied.

Referring to FIG. 4, in order to manage the mobility of a user equipment in the NAS layer located in the control plane of the user equipment and the MME, an EMM registration state (EMM-REGISTERED) and an EMM deregistration state (EMM-DEREGISTERED) may be defined depending on whether the user equipment has been attached to or detached from a network. The EMM-REGISTERED state and the EMM-DEREGISTERED state may be applied to the user equipment and the MME.

At the initial stage, such as a case where a user equipment is first powered on, the user equipment is in the EMM-DEREGISTERED state. In order to access the network, the user equipment performs a process of registering with the corresponding network through an initial attach procedure. When the connection procedure is successfully performed, the user equipment and the MME make transition to the EMM-REGISTERED state. Furthermore, if the user equipment is powered off or a radio link fails (if a packet error rate exceeds a reference value on the radio link), the user equipment is detached from the network and makes transition to the EMM-DEREGISTERED state.

Furthermore, in order to manage a signaling connection between the user equipment and the network, an ECM connected state (ECM-CONNECTED) and an ECM idle state (ECM-IDLE) may be defined. The ECM-CONNECTED state and the ECM-IDLE state may also be applied to the user equipment and the MME.

An RRC state indicates whether the RRC layer of a user equipment and the RRC layer of a base station have been logically connected. That is, if the RRC layer of the user equipment and the RRC layer of the base station are connected, the user equipment is in the RRC connected state (RRC_CONNECTED). If the RRC layer of the user equipment and the RRC layer of the base station are not connected, the user equipment is in the RRC idle state (RRC_IDLE).

Case when ECM state is Associated with RRC State

The ECM connection includes an RRC connection established between the user equipment and the base station and an S1 signaling connection established between the base station and the MME. In other words, enabling/disabling the ECM connection means that both RRC connection and S1 signaling connection are enabled/disabled.

The network may determine the presence of user equipment in the ECM-CONNECTED & RRC-CONNECTED state on a cell-by-cell basis and may effectively control the user equipment.

In contrast, the network cannot check the presence of the user equipment in the ECM-IDLE state, and a core network (CN) manages the user equipment in a tracking area unit, that is, an area unit larger than a cell. When the user equipment is in the ECM idle state, the user equipment performs discontinuous reception (DRX) configured by NAS using an ID uniquely allocated in a tracking area. That is, the user equipment may receive the broadcasting of system information and paging information by monitoring a paging signal at a specific paging occasion every user equipment-specific paging DRX cycle.

Furthermore, when the user equipment is in the ECM-IDLE state, the network does not have context information of the user equipment. Accordingly, the user equipment in the ECM-IDLE state may perform a user equipment-based mobility-related procedure, such as cell selection or cell reselection, without a need to receive a command from the network. If the location of the user equipment in the ECM idle state is different from that known to the network, the user equipment may notify the network of the location of the corresponding user equipment through a tracking area update (TAU) procedure.

In contrast, when the user equipment is in the ECM-CONNECTED & RRC-CONNECTED state, the mobility of the user equipment is managed by a command from the network. In the ECM-CONNECTED state, the network is aware of a cell to which the user equipment belongs. Accordingly, the network may transmit and/or receive data to the user equipment or from the user equipment, may control mobility, such as handover of the user equipment, and may perform cell measurement for a neighboring cell.

As described above, in order for a user equipment to receive a common mobile communication service such as voice or data, the user equipment must shift to the ECM-CONNECTED & RRC-CONNECTED state. At the initial stage, such as a case where the user equipment is first powered on, the user equipment is in the ECM-IDLE state like the EMM state. When the user equipment is successfully registered with a corresponding network through an initial attach procedure, the user equipment and an MME make transition to the ECM connected state. Furthermore, if the user equipment has been registered with the network, but a radio resource has not been allocated because traffic has been deactivated, the user equipment is in the ECM-IDLE state. When uplink or downlink new traffic is generated in the corresponding user equipment, the user equipment and the MME make transition to the ECM-CONNECTED state through a service request procedure.

Case when ECM State is Not Associated with RRC State

The ECM connection includes the RRC connection established between the user equipment and the base station and the S1 signaling connection established between the base station and the MME, but may be independent of the RRC state. That is, the ECM state between the user equipment and the MME may maintain the connected state even when the RRC state transitions from the connected state to the idle state.

Operations of the network/base station and user equipment in ECM-CONNECTED & RRC-CONNECTED state and ECM-IDLE state may be the same as operations in case when ECM state is associated with RRC state.

The network in the ECM-CONNECTED & RRC-IDLE state may perform the same operation as the operation in the ECM-CONNECTED state, but may manage the mobility of the user equipment in a specific unit including the base station and user equipment and may re-establish a connection (for example, S1 signaling connection, S1 data connection) path with MME/S-GW.

Therefore, the user equipment may perform different operations according to its state as follows.

ECM-IDLE message transmission for ECM and RRC connection state transition

ECM-CONNECTED & RRC-IDLE (excluding RRC-IDLE of the user equipment due to radio link failure): message transmission for resuming RRC connection state transition and connection recommence ECM-CONNECTED & RRC-IDLE (RRC-IDLE of the user equipment due to radio link failure): message transmission for RRC connection re-establishment.

Figure 5:
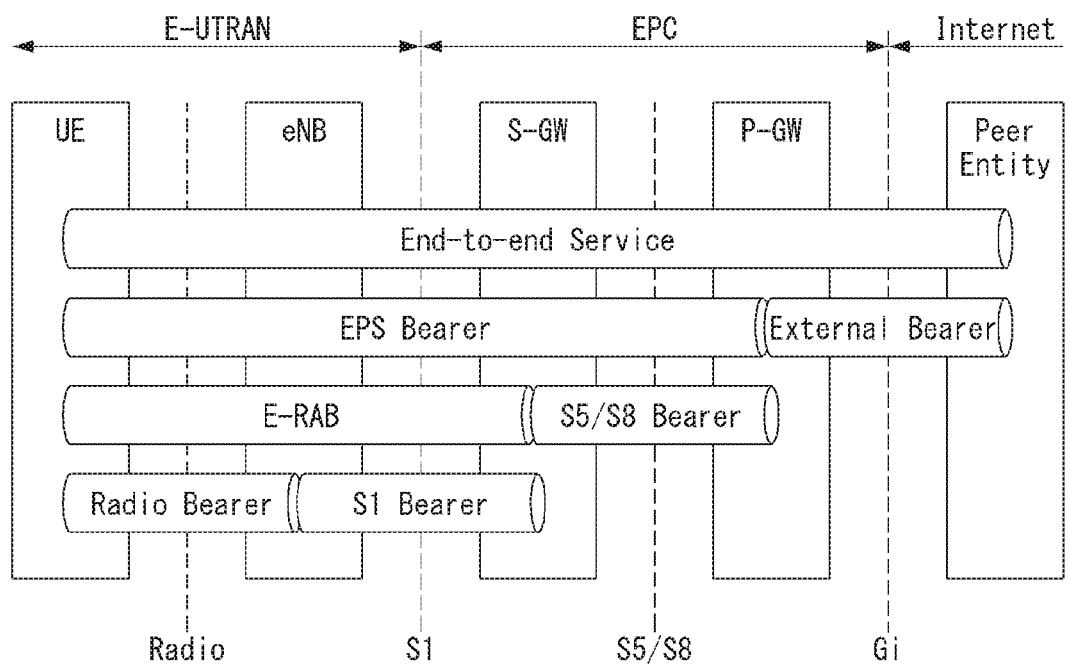
FIG. 5 illustrates a bearer structure in a wireless communication system to which the present invention may be applied.

FIG. 5 is a diagram illustrating a bearer structure in a wireless communication system to which the present invention may be applied.

When a UE is connected to a Packet Date Network (PDN), a PDN connection is generated, and the PDN connection may also be called an EPS session. A PDN is an internet protocol network which is exterior or interior of a service provider, and provides a service function such as an internet or IP Multimedia Subsystem (IMS).

The EPS session has one or more EPS bearer. The EPS bearer is the transmission path of traffic generated between a user equipment and a PDN GW in order for the EPS to transfer user traffic. One or more EPS bearers may be configured per user equipment.

Each EPS bearer may be divided into an E-UTRAN radio access bearer (E-RAB) and an S5/S8 bearer. The E-RAB may be divided into a radio bearer (RB) and an S1 bearer. That is, the EPS bearers correspond to the RB, S1 bearer, and S5/S8 bearer, respectively.

The E-RAB transfers the packet of an EPS bearer between a user equipment and an EPC. If the E-RAB is present, the E-RAB bearer and the EPS bearer are mapped in a one-to-one manner A data radio bearer (DRB) transfers the packet of the EPS bearer between the user equipment and an eNB. If the DRB is present, the DRB and the EPS bearer/E-RAB are mapped in a one-to-one manner. The S1 bearer transfers the packet of the EPS bearer between the eNB and the S-GW. The S5/S8 bearer transfers an EPS bearer packet between the S-GW and the P-GW.

The user equipment binds a service data flow (SDF) to the EPS bearer of an uplink direction. The SDF is an IP flow or a gathering of IP flows in which user traffic has been classified (or filtered) for each service. A plurality of SDFs may be multiplexed with the same EPS bearer by including a plurality of uplink packet filters. The user equipment stores mapping information between an uplink packet filter and a DRB in order to bind the SDF and the DRB in the uplink.

The P-GW binds the SDF to the EPS bearer in a downlink direction. The plurality of SDFs may be multiplexed with the same EPS bearer by including a plurality of downlink packet filters. The P-GW stores mapping information between the downlink packet filters and the S5/S8 bearer in order to bind the SDF and the S5/S8 bearer in the downlink.

The eNB stores one-to-one mapping between the DRB and the S1 bearer in order to bind the DRB and the S1 bearer in the uplink/downlink. The S-GW stores one-to-one mapping information between the S1 bearer and the S5/S8 bearer in order to bind the S1 bearer and the S5/S8 bearer in the uplink/downlink.

The EPS bearer is divided into two types of a default bearer and a dedicated bearer. A user equipment may have one default bearer or one or more dedicated bearers per PDN. The least default bearer having an EPS session with respect to one PDN is called a default bearer.

The EPS bearer may be classified based on an identity. The EPS bearer identity is allocated by a user equipment or an MME. The dedicated bearer(s) is combined with a default bearer by a linked EPS bearer identity (LBI).

When a user equipment is initially attached to a network through an initial attach procedure, it receives an IP address allocated thereto and thus a PDN connection is generated. A default bearer is generated at the EPS interval. The default bearer is maintained without being released unless the PDN connection with the user equipment is terminated although there is no traffic between the user equipment and a corresponding PDN. When the corresponding PDN connection is terminated, the default bearer is also released. In this case, all of bearers in the interval forming a default bearer with the user equipment are not activated, but an S5 bearer having a direct connection with the PDN is maintained and E-RAB bearers (i.e., DRB and S1 bearer) associated with a radio resource are released. Furthermore, when new traffic is generated in the corresponding PDN, an E-RAB bearer is reconfigured to transfer traffic.

While a user equipment uses a service (e.g., Internet) through a default bearer, if the user equipment uses a service (e.g., video on demand (VoD)) insufficient to receive quality of service (QoS) using only the default bearer, a dedicated bearer when the user equipment demands the dedicated bearer. If there is no traffic of the user equipment, the dedicated bearer is released. A user equipment or a network may generate a plurality of dedicated bearers, if necessary.

An IP flow may have a different QoS characteristic depending on that a user equipment uses which service. When a network establishes/modifies an EPS session for the user equipment, it determines a control policy for the allocation of a network resource to QoS and applies it while the EPS session is maintained. This is called policy and charging control (PCC). A PCC rule is determined based on an operator policy (e.g., QoS policy, a gate status and a billing method).

The PCC rule is determined in an SDF unit. That is, an IP flow may have a different QoS characteristic depending on a service used by a user equipment. IP flows having the same QoS are mapped to the same SDF, and the SDF becomes a unit in which the PCC rule is applied.

A policy and charging control function (PCR) and a policy and charging enforcement function (PCEF) may correspond to main entities that perform such a PCC function.

The PCRF determines a PCC rule for each SDF when an EPS session is generated or changed and provides it to a P-GW (or PCEF). The P-GW configures the PCC rule for a corresponding SDF, detects an SDF every transmitted/received IP packet, and applies the PCC rule for the corresponding SDF. When the SDF is transmitted to a user equipment via the EPS, it is mapped to an EPS bearer capable of providing proper QoS according to a QoS rule stored in the P-GW.

The PCC rule is divided into a dynamic PCC rule and a pre-defined PCC rule. The dynamic PCC rule is dynamically provided from the PCRF to the P-GW when the EPS session is established/modified. In contrast, the pre-defined PCC rule is previously configured in the P-GW and activated/deactivated by the PCRF.

An EPS bearer is a basic QoS parameter and includes a QoS class identifier (QCI) and an allocation and retention priority (ARP).

The QCI is a scalar used as a criterion for accessing node-specific parameters that controls bearer level packet forwarding treatment. A scalar value is pre-configured by a network operator. For example, the scalar may be pre-configured as one of integer values 1 to 9.

A main object of an ARP is for determining whether the establishment or modification request of a bearer has to be accepted or rejected if a resource is restricted. Furthermore, the ARP may be used to determine whether which bearer(s) has to be dropped by an eNB in an exceptional resource restriction (e.g., handover) situation.

The EPS bearer is divided into a guaranteed bit rate (GBR) type bearer and a non-guaranteed bit rate (non-GBR) bearer according to a QCI resource form. A default bearer may be always a non-GBR type bearer, and a dedicated bearer may be a GBR type or non-GBR type bearer.

The GBR type bearer is a QoS parameter other than the QCI and the ARP and has the GBR and a maximum bit rate (MBR). The MBR means that a resource fixed for each bearer is allocated (guarantee a bandwidth). In contrast, the non-GBR type bearer is a QoS parameter other than the QCI and the ARP and has an aggregated MBR (AMBR). The AMBR means that a maximum bandwidth capable of being used along with another non-GBR type bearer is allocated without allocating a resource for a bearer.

If the QoS of the EPS bearer is determined as described above, the QoS of each bearer is determined for each interface. The bearer of each interface provides the QoS of the EPS bearer for each interface, and thus all of the EPS bearer, an RB, and S1 bearer have a one-to-one relation.

While a user equipment uses a service through a default bearer, if the user equipment uses a service incapable of receiving QoS using only the default bearer, a dedicated bearer is generated in response (on-demand) to a request from the user equipment.

Figure 6:
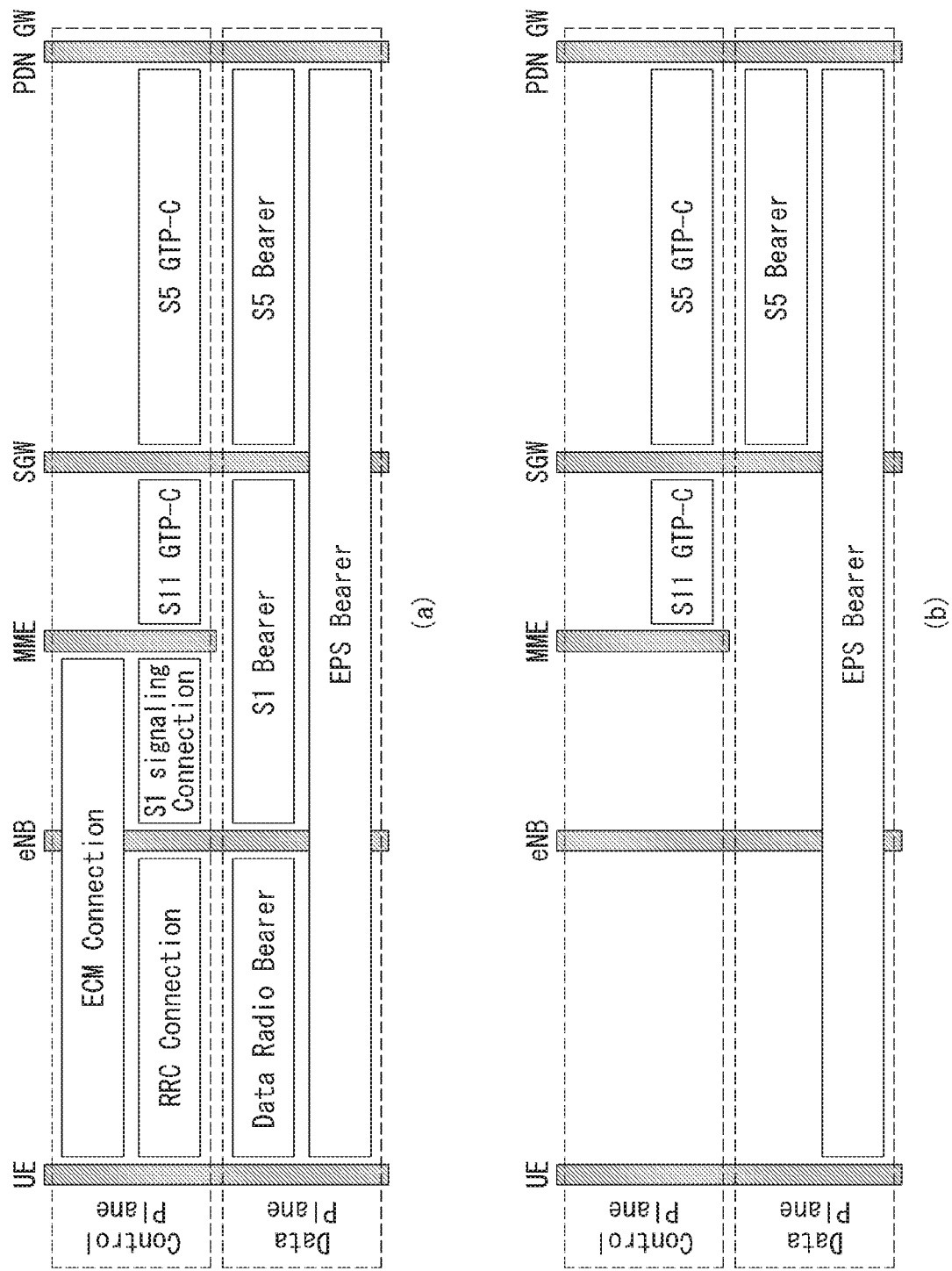
FIG. 6 illustrates a transmission path of a control plane and user plane in an EMM registered state in a wireless communication system to which the present invention may be applied.

FIG. 6 is a diagram illustrating the transmission path of a control plane and a user plane in an EMM registration state in a wireless communication system to which the present invention may be applied.

FIG. 6(a) illustrates an ECM-CONNECTED state, and FIG. 16(b) illustrates ECM-IDLE.

When a user equipment becomes the EMM-Registered state by successfully attaching to a network, it is provided with a service using an EPS bearer. As described above, the EPS bearer is divided into a DRB, an S1 bearer, and an S5 bearer for each interval.

As in FIG. 6(a), in the ECM-CONNECTED state having user traffic, an NAS signaling connection, that is, an ECM connection (i.e., RRC connection and S1 signaling connection), is established. Furthermore, an S11 GPRS tunneling protocol control plane (GTP-C) connection is established between the MME and SGW, and an S5 GTP-C connection is established between the SGW and the PDN GW.

Furthermore, in the ECM-CONNECTED state, all of the DRB, the S1 bearer and the S5 bearer are configured (i.e., radio or network resource allocation).

As in FIG. 6(b), in the ECM-IDLE state not having user traffic, the ECM connection (i.e., RRC connection and S1 signaling connection) is released. In this case, the establishment of the S11 GTP-C connection between the MME and the SGW and the establishment of the S5 GTP-C connection between the SGW and the PDN GW are maintained.

Furthermore, in the ECM-IDLE state, both the DRB and the S1 bearer are released, but the configuration (i.e., radio or network resource allocation) of the S5 bearer is maintained.

Figure 7:
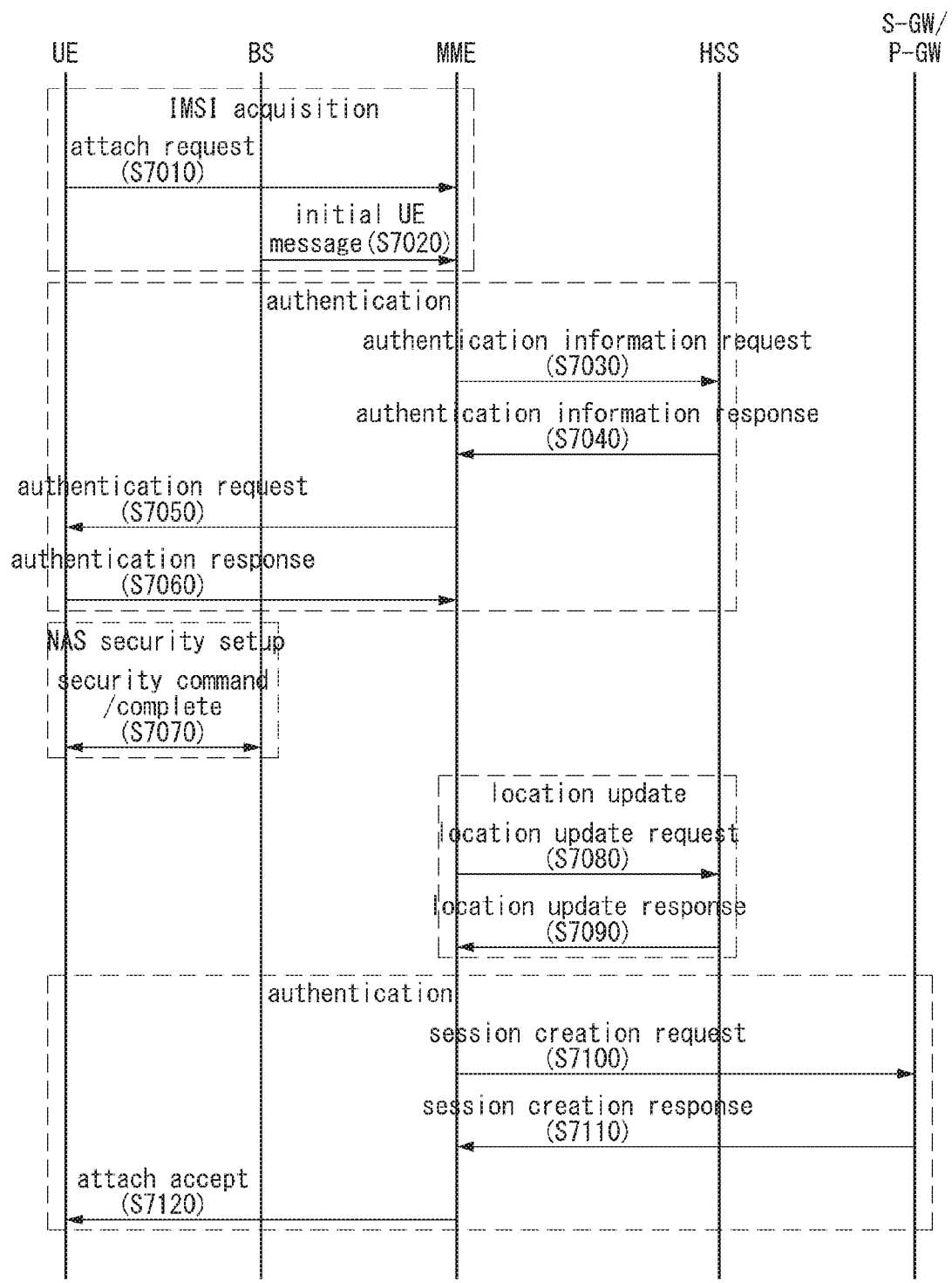
FIG. 7 is a flow chart showing one example of an initial attach procedure in a wireless communication system to which the present invention may be applied.

FIG. 7 is a flow chart showing one example of an initial attach procedure in a wireless communication system where the present invention may be applied.

As shown in FIG. 7, the initial access procedure may mainly include following 5 steps: (1) Acquisition of IMSI, (2) authentication, (3) NAS security setup, (4) location update and (5) (EPS Session Establishment.

MSI Acquisition (Acquisition of IMSI)

This procedure is the procedure by which the LTE network (MME) acquires the IMSI value of the user equipment. The user equipment transmits its IMSI to the MME via the base station using an attach request message (S7010). User equipment once attached to the network may be allocated GUTIs from the LTE network. Then, upon re-attach, the UE may transmit a GUTI instead of the IMSI to the MME.

The base station transmits, to the MME, an initial UE message including the Cell ID (ECGI) attached by the user equipment and TAI information indicating a tracking area in which the user equipment is present (S7020).

(Authentication)

When acquiring the IMSI value of the user equipment, MME transmits to the HSS an authentication information request message for requesting authentication information (authentication vector: AV) in order to authenticate the user equipment (S7030).

The HSS creates the AV for the user equipment, and transmits an authentication information response message including the created AV to the MME (S7040). AV may include RAND, AUTN, XRES, KASME.

Upon receiving the AV from the HSS, the MME prepares for authenticating the user equipment. The MME may send an authentication request message including a portion (for example, RAN, AUTN, etc.) of the AV information received from the HSS to the user equipment (S7050).

The user equipment compares the AUTN value included in the received authentication request message with the AUTN created by the user equipment. If the values are the same, the UE authenticates the corresponding LTE network.

After the user equipment authenticates the LTE network, the user equipment transmits an authentication response message including the RES value created by the UE to the MME. In response, the MME authenticates the user equipment by comparing the XRES transmitted from the HSS with the RES transmitted from the user equipment.

NAS Security Setup or Establishment

The user equipment is authenticated via the authentication procedure. In step S7070, the UE performs a security establishment procedure by transmission/reception of a security mode command/complete message to securely transfer the NAS message (message between the user equipment and the MME) in the wireless section. When the NAS security establishment procedure is terminated, the NAS message is securely transmitted/received in the wireless section.

Location Update

The MME transmits an Update Location Request message including the IMSI and MME ID of the user equipment to inform the HSS of an IMSI value of the user equipment attached to the network (S7080). The HSS stores or registers the transmitted information.

The HSS transmits to the MME an Update Location Answer message including the service profile (QoS Profile) corresponding to the IMSI of the attached user equipment (S7090).

The response message includes an IMSI of the user equipment, a subscribed APN (Access Point Name), a subscribed P-GW ID, and a subscribed QoS profile, the subscribed QoS profile may include QCI, ARP, APN -AMBE (UL/DL), and UE-AMBR (UL/DL).

The APN can also may be expressed as an application packet network

EPS Session Establishment

The MME transmits a Create Session Request message to the S-GW to create an EPS Session (EPS Bearer) based on the service profile transmitted from the HSS. The S-GW transmits the Create Session Request message to the P-GW (S7100). The session creation request message includes an IMSI of the user equipment, and the subscribed QoS profile transmitted from the HSS.

The P-GW allocates the IP address to be used by the user equipment. The P-GW transmits the transmitted subscribed QoS Profile to the PPCRF and requests the QoS Profile to be used last by the user equipment.

The PCRF requests an access profile (Access Profile) for the IMSI to the SPR. The SPR transmits the value to the PCRF.

The PCRF determines a last QoS profile to be used by the user equipment using the subscribed QoS profile transmitted from the P-GW and the access profile transmitted from the SPR, and transmits the determined last QoS profile to the P-GW.

The P-GW creates the EPS Bearer (GTP tunnel) based on the last QoS profile transmitted from the PCRF.

The P-GW creates an EPS Bearer. Then, the P-GW transmits a Session Create Response message including the last QoS profile to the S-GW.

The S-GW also creates the EPS Bearer (GTP tunnel) based on the last QoS profile transmitted from the P-GW. The S-GW transmits a session creation response message including the last QoS profile to the MME (S7110).

The MME transmits an Attach Accept message including the IP address to be used by the user equipment and the last QoS profile to the user equipment (S7120).

The user equipment then performs the AS security establishment procedure to protect the control signal and user data in the wireless section with the base station, and performs a DRB tunnel creation procedure to create the DRB tunnel.

When the initial access procedure as described above is completed, the EPS Bearer creation is completed. Then, the user equipment may use services such as the Internet via the base station, S-GW and P-GW.

Figure 8:
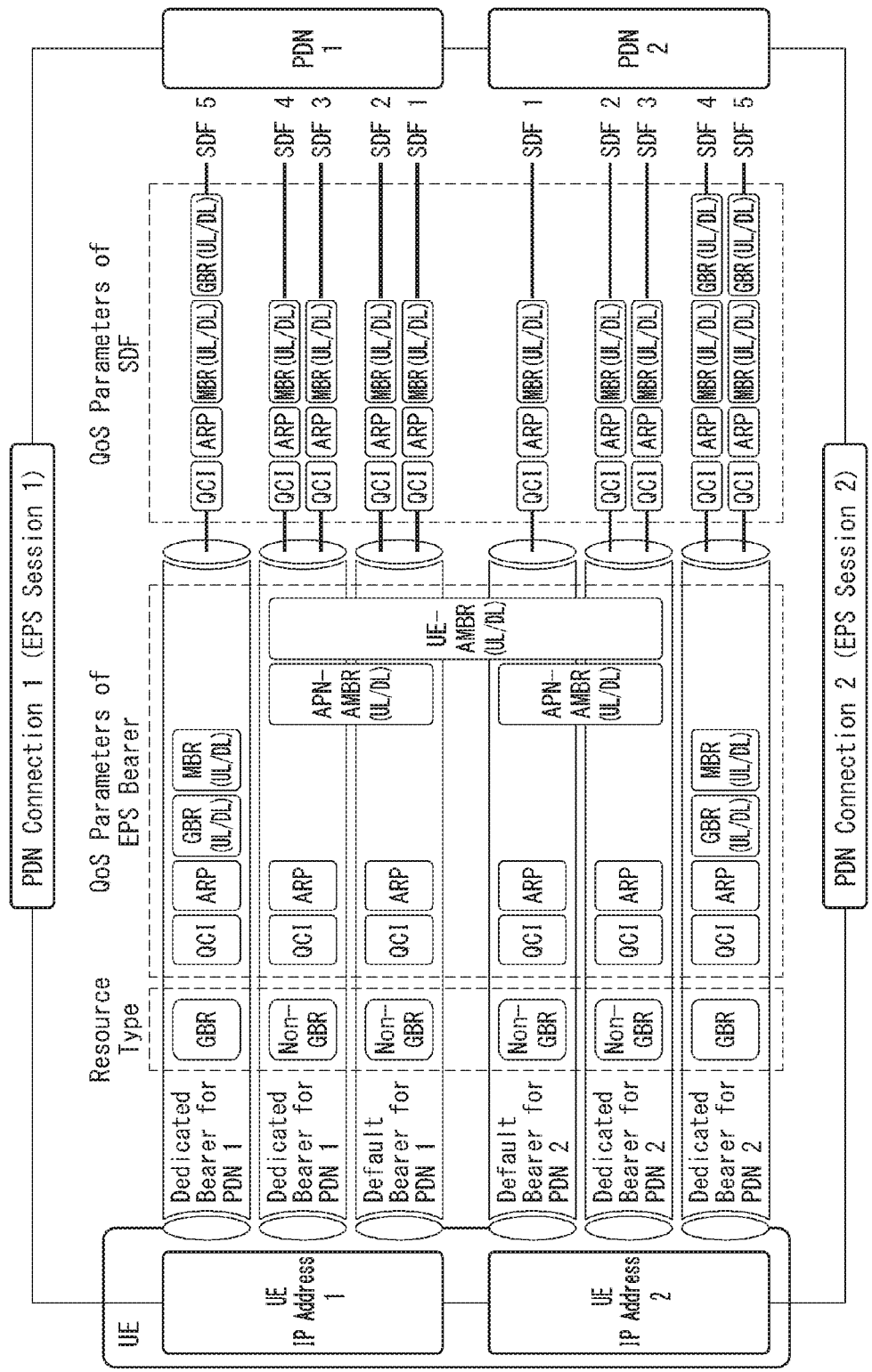
FIG. 8 shows one example of parameter configuration for QoS (Quality of Service) management.

FIG. 8 shows one example of parameter configuration for QoS (Quality of Service) management.

Referring to FIG. 8, the wireless communication system applies QoS policy on the SDF (Service Data Flow) basis and on the EPS bearer basis. The SDF (Service Data Flow) includes one or more IP flows as classified based on the service type. The EPS bearer acts as a logical path along which one or more SDFs are transmitted. That is, the QoS of the data to be transmitted/received may be managed by the following QoS parameters.

Resource type: bandwidth guaranteed type and non-guaranteed type

Guaranteed bit rate (GBR): Guaranteed minimum bandwidth

Maximum bit rate (MBR): Maximum bandwidth as allowed

Access point name-Aggregate Maximum Bit Rate (APN-AMBR): Maximum bandwidth allowed per APN UE-AMBR: maximum bandwidth allowed per user equipment When a packet inflows in a manner exceeding the bandwidth specified in the MBR, APN-AMBR, and UE-AMBR QoS parameters, each entity mentioned below discards overflowed packets.

Rate Policing for Downlink Data

First: the P-GW discards a quantity of the incoming packets in excess of the MBR for each SDF.

Second: the P-GW discards a quantity of packets in excess of the MBR for one or more SDFs which have been introduced into each GBR EPS bearer and discards a quantity of packets exceeding the APN-AMBR for one or more SDFs which have been introduced into all non-GBR EPS bearers.

Third: the base station discards a quantity of packets exceeding the UE-AMBR for one or more SDFs that have been introduced into all No-GBR EPS bearers.

Rate Policing for Uplink Data

First: the user equipment discards a quantity of packets in excess of MBR (GBR) and APN-AMBR (Non-GBR).

Second: The base station discards a quantity of packets in excess of MBR (GBR) and UE-AMBR (Non-GBR).

Third: the P-GW discards a quantity of packets in excess of the APN-AMBR for one or more SDFs which have been introduced in all Non-GBR EPS bearers and discards a quantity of packets in excess of the MBR for each SDF.

The QoS parameters as described above may be applied to each of the user equipments. In this way, the amount of packets in excess of the QoS parameters that may be applied to each user equipment are discarded. Further, there is a limit in improvement of the data transmission rate of each user equipment using QoS parameters of each user equipment.

Thus, to solve the problem in accordance with the present invention, a data boosting control method is provided in which a service is received from the same gateway using a number of communication devices included in one wireless device.

The data boosting method described herein may be interpreted as a method of increasing the data transmission rate by receiving a service using one or more communication devices included in one wireless device.

The communication devices included in the wireless device share a specific layer of the wireless device, as described below.

FIG. 9 is a block diagram of one example of a radio protocol architecture for a wireless device to which the present invention may be applied.

A wireless device as described herein may also refer to a user platform that includes one or more communication devices.

The communication device may also refer to a communication modem itself, which may be implemented to communicate with externals. Alternatively, the communication device may refer to a device including the communication modem.

That is, the wireless device may refer to a device that includes communication devices with the same or different Radio Access Technologies (RATs).

Thus, the communication device may be exchanged with a wireless user equipment, a communication modem, or the like.

Further, the wireless device may refer to a UE defined in 3GPP. However, it may be desirable for the wireless device to be interpreted beyond the UE defined in 3GPP. That is, the wireless device may be a vehicle, and so on in one example.

Further, the communication device may include a first communication device and one or more second communication devices.

The first communication device may refer to a communication device in the same user platform that first accesses the network. The first communication device may be referred to as a master user equipment, a special user equipment, a primary user equipment, or a first user equipment.

Hereinafter, the first communication device will be abbreviated as a S (special)-UE.

Further, the second communication device refers to a communication device that subsequently (or after the access of the first communication device) accesses the network. The second communication device may be referred to as slave user equipment, virtual user equipment, secondary user equipment, second user equipment, or the like.

Hereinafter, the second communication device will be abbreviated as a V (Virtual)-UE.

That is, the second communication device means a communication device that additionally accesses the network when the S-UE is already present in the same user platform.

Further, the communication devices within the user platform may share an application layer, a transmission layer and a network layer, as shown in FIG. 9(a).

At this time, when the user platform transmits uplink data to the base station using multiple communication devices, adaptation in the network layer plays a role in determining which communication device transmits the uplink data. That is, the adaptation determines a routing path for the uplink data.

Further, each communication device may individually include an NAS layer, an RRC layer, a MAC layer, an RLC layer, a PDCP layer and a PHY layer, as shown in FIG. 9(b).

The layers that constitute the user platform may be physically located at the same location or in a distributed manner At this time, when the S-UE transitions to the idle state, one V-UE among the V-UEs may act as an S-UE.

When, as described above, a plurality of communication devices are included in one user platform, each communication device may individually access the network to transmit/receive data.

Here, the majority of communication devices may use the same RAT or different RATs.

However, since the communication devices in the user platform are allocated different IP addresses, the communication devices may not receive the same service from the same gateway.

Thus, even when the user platform includes the multiple communication devices, the user platform may not exceed a maximum data transmission rate based on the QoS parameter of each communication device.

Therefore, in the following, there is disclosed a method for allocating the same IP address to the communication devices in the same user platform, thereby to increase the data transmission rate using the plurality of communication devices. That is, a data boosting method will be described.

Figure 10:
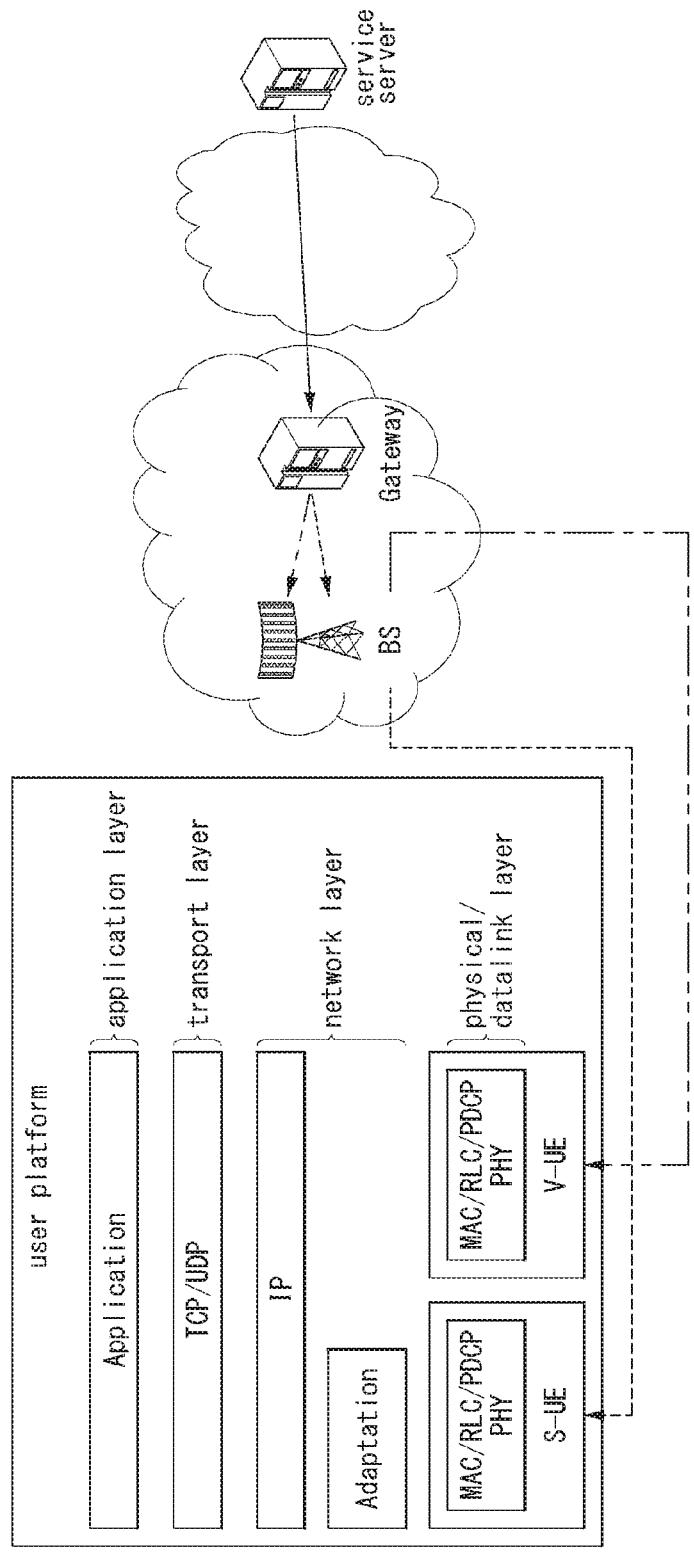
FIG. 10 shows one example of a data transmission/reception method between a user platform and a base station to which the present invention may be applied.

FIG. 10 shows one example of a data transmission/reception method between a user platform and a base station to which the present invention may be applied.

In FIG. 10, it may be assumed that the S-UE and V-UE are allocated the same IP address.

A service server transmits data related to a service provided by the service server to a gateway of a cellular network over the Internet network.

The cellular network may include the base station, and the gateway.

The gateway may include at least one of the S-GW or P-GW.

The gateway transmits to the base station the downlink data to be transmitted to the communication device in the user platform. Then, the base station transmits the received downlink data to at least one communication device of the user platform.

At this time, since the S-UE and the V-UE have the same IP address, the user platform may receive the downlink data from the gateway using the two UEs (S-UE, V-UE) included in the user platform rather than using only one UE.

The downlink data as transmitted from the gateway is transmitted to the user platform through the base station.

Here, the base station does not know that the S-UE and V-UE constitute the single user platform. Therefore, the base station plays only a role in transferring the downlink data as transmitted from the gateway to the S-UE and V-UE.

That is, when the gateway allocates the same IP address to the S-UE and the V-UE and transmits the data to the user platform using the allocated IP address as a destination address. Thus, the V-UE as well as the S-UE may receive the data. This may improve the data transmission rate.

At this time, the S-UE and V-UE may act as user equipments linked to each other.

Here, the linked user equipments may refer to user equipments that are included in the same user platform and share the upper layer (application layer, transmission layer, network layer) of the user platform.

The communication devices (e.g., S-UE, V-UE) constituting the user platform communicate with the network entity (e.g., base station, MME, etc.) in the network using the same communication protocol.

The network entity or network node processes each of the communication devices (S-UE, V-UE) constituting the user platform independently or individually using the same protocol.

Further, since each of the communication device constituting the same user platform must communicate with the cellular network, each communication device must be individually subscribed to the cellular network. That is, the user platform must be subscribed to the network times corresponding to the total number of communication devices that constitute the user platform.

In this way, the methods proposed herein may use a number of the mutually-linked communication devices included in the same user platform to receive the same service, thereby improving the data transmission rate.

Figure 11:
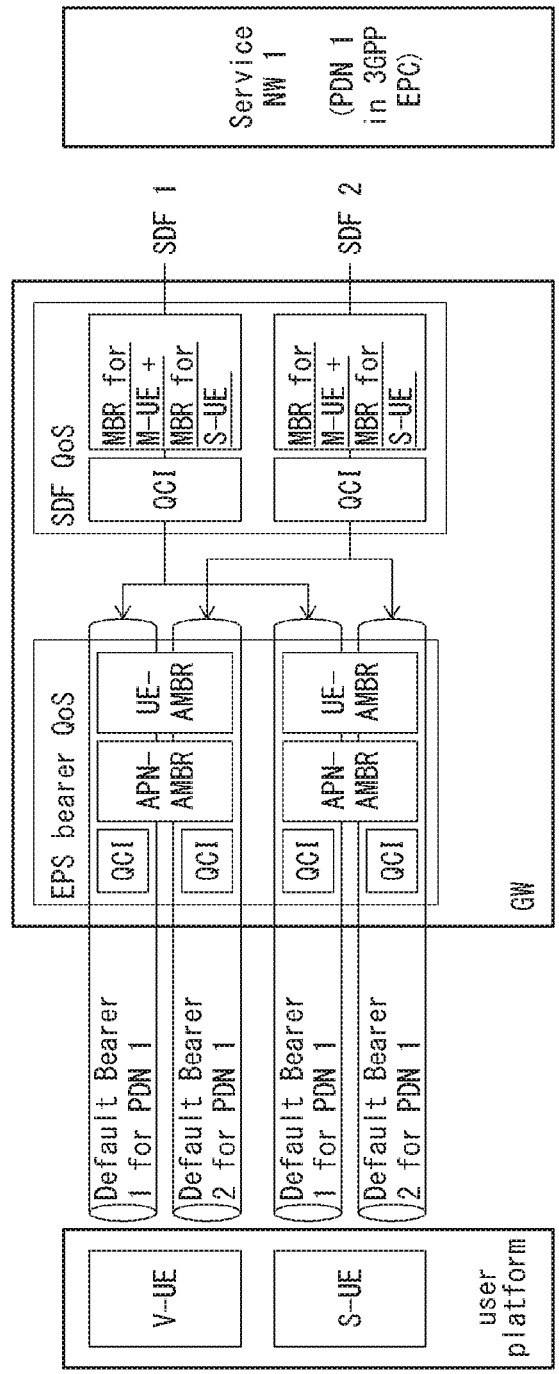
FIG. 11 shows one example of parameter configuration for Quality of Service (QoS) management to which the present invention may be applied.

FIG. 11 shows one example of parameter configuration for Quality of Service (QoS) management.

In order to improve the data transmission rate associated with the service from the specific user platform by allocating the same IP address to the plurality of the mutually-linked communication devices within the specific user platform, separate rate policing should be applied as shown in FIG. 11.

As shown in FIG. 11, SDF 1 is transmitted to V-UE and S-UE via two Default Bearers, while SDF 2 is transmitted to V-UE and S-UE via two dedicated bearers.

That is, multiple paths to different communication devices may be present for one SDF. Considering this, the following rate policing should be applied.

The rate policing to be considered for the data boosting proposed in this specification will be described.

First, the operations of the gateway may be divided into an operation related to the SDF and an operation related to the logical paths (for example, EPS Bearer, etc.) for data transmission/reception.

The gateway operates with a maximum bit rate (MBR) considering the multiple paths mapped to each SDF.

For example, the MBR may refer to the sum of the MAX Bit Rates of all user equipments, each of which maps to one SDF to constitute the multi-paths.

Further, the gateway distributes the downlink data so that the distribution rate does not exceed the QoS parameters (for example, MBR, APN-AMBR, and UE-AMBR) of each user equipment constituting the multi-paths.

Next, the user platform sublayer operation (adaptation) may be associated with the data logical path.

That is, the sublayer of the user platform operates to distribute the uplink data so that the distribution rate does not exceed the MBR and APN-AMBR of each of the user equipment constituting the multiple paths.

As described above, in the method proposed in the present specification, the separate rate policing may be applied to a plurality of communication devices allocated with the same IP address. As a result, the data transmission rate of the service provided to the user platform may be improved as compared with the case of receiving data using one communication device.

Hereinafter, a method for establishing multiple paths for data boosting using multiple communication devices included in the user platform in a PDN connectivity creation procedure (or EPS session creation procedure or access procedure) between the user equipment and the core network as proposed according to the present disclosure will be described in detail with reference to the related drawings.

The disclosure to be described later will be described with reference to the disclosures in FIGS. 7 to 11.

The user platform (or wireless device) includes at least one communication devices. The communication device may be represented as a communication modem, a wireless communication modem, or the user equipment.

According to the present disclosure, the proposed method provides a method to satisfy the service requirement of the next generation communication system such as 5G using multiple communication devices supporting the 4G, and LTE(-A) system without changing the signaling procedure between the user equipment (UE) and the base station, and the signaling procedure between the user equipment (UE) and the MME as defined in 3GPP, 4G, and LTE(-A) standard.

In particular, the methods to be described below are characterized in that a base station only forwards a signal transmitted/received from a gateway (for example, S-GW and/or P-GW) or the user equipment (communication devices), while the gateway directly performs the control for data boosting.

Before describing the methods (first embodiment to third embodiment), the PDN connectivity procedure (or attach procedure or EPS session creation procedure) (for a new APN or additional APN) between a number of communication devices and a core network (CN) as proposed by the present disclosure is first discussed.

The APN stands for Application Packet Network, which means a network for providing specific services such as Internet, movie, and IMS. Thus, the network that provides services based on APNs may be distinguished from other networks.

Further, the PDN connectivity may be used to express the creation of the EPS bearer as shown in FIG. 7.

First, we consider the operation between the at least one communication device in the user platform and the core network (or CN or core node) to create the PDN connectivity for a new or additional APN.

The at least one communication device (S-UE, V-UE) performs an EPS session creation procedure with the core network in the same manner as the procedure as shown in FIG. 7.

That is, in order that each communication device in conjunction with the core network create a Default EPS Bearer, each communication device transmits a PDN Connectivity Request message to MMEs, each of which manages each communication device.

Here, there may be only one MME in the core network. In this connection, may be a plurality of MMEs corresponding to each communication device.

That is, when there is one MME in the core network, one MME manages a number of communication devices.

Alternatively, when there are multiple MMEs in the core network, each of the plurality of MMEs manages each corresponding communication device.

Then, when the MME receives the PDN Connectivity Request message, the MME transmits a session establishment (or creation) request message to the gateway (S-GW, P-GW). Thereafter, the MME receives a session establishment response message from the gateway in response to the session establishment request message.

Thereafter, the MME creates the PDN connectivity for the new APN by performing the default EPS Bearer Context Activation procedure with each communication device.

This is disclosed in more details in FIG. 7.

Next, a reference will be made to the internal operation of the user platform, that is, and the wireless device.

First, the user platform determines whether to apply data boosting to the new APN or additional APN.

Here, the data boosting refers to a method for increasing the data transmission rate for a specific service by forming the multi-paths between a plurality of communication devices and a gateway and transmitting/receiving data having the same IP address via the multi-paths as formed.

When the data boosting is applied to the new or additional APN, the user platform determines communication devices to build up the multi-paths.

Here, the communication devices constituting the multi-paths may be composed of one first communication device (S-UE) and one or more second communication devices (V-UEs).

One first communication device may have an EMM-Registered state, an ECM-Connected state and an RRC connected state. The second communication device may have an EMM-Registered state, an ECM-Connected state, and may have an RRC connected state or an idle state.

Further, a specific MME indicating of another MME that it has received the PDN Connectivity Request, has an EMM-Registered state or an ECM-Connected state. Another MME receiving a PDN Connectivity Request from the specific MME has an EMM-Registered state and an ECM-Connected state or an ECM-Idle state.

Here, the MME may be represented in one example, typically as a network entity, a network node, or a core network node. Hereinafter, for convenience of explanation, this will be expressed using 'MME' which is a terminology defined in the 3GPP LTE(-A) system.

However, the method proposed according to the present disclosure is not limited to the terminology of the MME. The expression of the MME may be replaced with a newly defined terminology in the 5G system.

The reason for expressing the specific state of the communication device or MME as a dotted line In FIG. 12 to FIG. 14, which will be described later, is as follows: the communication device or MME may have the state as shown in the figures or may have a state opposite to that as shown in the figures.

Thereafter, each of the communication devices determined to form the multi-paths transmits a default EPS bearer creation request message (for example, PDN Connectivity Request message) to the MME corresponding to each communication device.

Next, the internal operation of the core network (or CN) will be described.

Here, the core network may be interpreted as a network containing at least one of the MME, S-GW or P-GW, which manages the context for the communication device.

That is, the core network may contain one or more MMEs.

In order to perform the PDN connectivity procedure for a new or additional APN using multiple communication devices as proposed according to the present disclosure, the coordination between the MMEs in the core network is required.

For the coordination between the MMEs in the core network, the MMEs that manage the communication devices respectively share the fact that each MME has received a PDN Connectivity request message from each communication device.

At this time, if the specific MME is notified in advance that the other MMEs have received the PDN Connectivity Request message for the same APN, before the specific MME notifies the other MMEs that the specific MME has received the PDN Connectivity Request message, the specific MME does not notify the other MMEs that the specific MME has received the PDN Connectivity Request message for the same APN.

The MMEs in the core network then share the IP address of the communication device associated with the shared PDN Connectivity Request message.

That is, only a specific MME that performs the session establishment procedure for the APN/PDN Connectivity Request for the first time receives the IP address of the corresponding communication device from the S-GW. Then, the specific MME shares the allocated IP address of the communication device with the other MMEs.

Next, the specific MME that first received the PDN Connectivity Request message shares the created EPS Bearer ID associated with the corresponding APN/PDN with other MMEs.

Thereafter, other MMEs create a default EPS bearer such that the IP address of the communication device as notified by the specific MME is equally allocated to another communication device constituting the multi-paths.

For convenience of explanation, the network entity (or network node) that performs the functions (for example, management of a list of UEs linked to the user equipment (UE) managed by the MME itself and detailed information about the UEs, coordination with another MME, establishment of a logical path (EPS Bearer) for data transmission) to perform the proposed method according to the present disclosure may be expressed as a network node nomination (MME, P-GW, S-GW) as defined in 4G LTE system in one example.

However, this is only for ease of explanation. The network node as described in the present disclosure is not limited to the MME, P-GW, and S-GW.

Hereinafter, methods proposed in accordance with the present disclosure, which constitutes the multi-paths in the PDN connectivity creation procedure for data boosting using a plurality of communication devices, will be described with reference to various embodiments.

The communication device included in the user platform will be expressed as 'the user equipment UE' in the example of FIG. 12 to FIG. 14 to be described later, for the convenience of understanding.

First Embodiment

The first embodiment provides a signaling method between MMEs by which the MMEs assign the same IP address to the user equipments for a new or additional APN when the MMEs corresponding to the UEs in the user platform are individually present in the core network.

Figure 12:
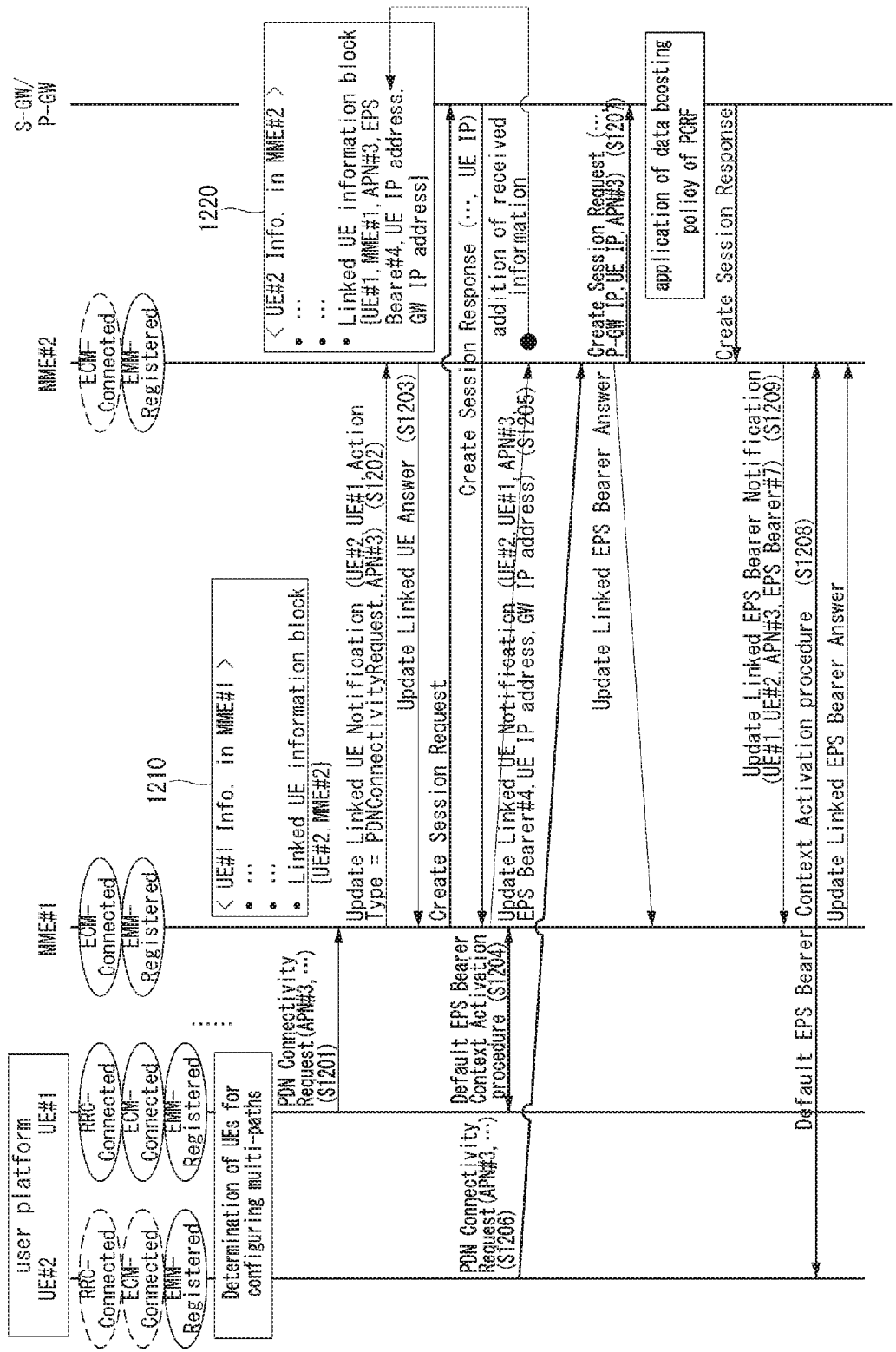
FIG. 12 is a flow chart showing one example of a method for configuring multi-paths for data boosting using multiple user equipments as proposed in accordance with the present disclosure.

FIG. 12 is a flow chart showing one example of the proposed method according to the present disclosure for constructing the multi-paths for data boosting using a number of the user equipments UEs.

Before referring to FIG. 12, we assume the following three configurations:

(1) The number of communication devices in the user platform shown in FIG. 9, where the proposed method may be applied according to the present disclosure, is two.

(2) The user equipments are managed by different MMEs. That is, the user equipment #1 is managed by MME #1, and the user equipment #2 is managed by MME #2.

(3) Before the MME #2 receives the PDN Connectivity Request message for the user equipment #2, MME #2 first recognizes that the user equipment #1 has transmitted a PDN Connectivity Request message to MME #1.

Referring to FIG. 12, one example of a method for constructing the multi-paths for data boosting when a separate MME per user equipment is configured in the core network will be described in detail.

As shown in FIG. 12, it is assumed that there are multiple MMEs (MME #1, and MME #2) respectively associated with the user equipments in the core network.

For the convenience of understanding, operations of respective MMEs in order to establish the multi-paths will be individually illustrated.

First, an operation of the MME #1 in which the MME #1 receives a PDN Connectivity Request message from the user equipment #1 will be described.

The MME #1 receives a PDN Connectivity Request message for the new or additional APN from the user equipment #1 (S1201).

The PDN Connectivity Request message may include the user equipment context information including an identifier indicating the new or additional APN. In the case of FIG. 12, it may be seen that APN #3 is included in the PDN Connectivity Request message.

The user equipment context information may include the information block about the user equipment linked to the user equipment #1.

The information block 1210 about the user equipment linked to the user equipment #1 may include an identifier (the user equipment #2) of the user equipment linked to the user equipment #1, and an identifier (MME #2) of the MME managing the user equipment linked to the user equipment #1 and so on.

Thereafter, the MME #1 determines, based on the received PDN Connectivity Request message, whether the user equipment linked with the user equipment #1 is present.

As shown in FIG. 12, it may be seen that the user equipment #2 is present as the user equipment linked to the user equipment #1.

Next, the MME #1 determines whether there is a linked user equipment (Linked UE) requesting EPS bearer creation for APN #3 included in the received PDN Connectivity Request message. Alternatively, the MME #1 determines whether there is a linked user equipment (Linked UE) keeping the EPS Bearer already created for the APN #3.

Referring to FIG. 12, it may be seen that there is absent the linked user equipment (Linked UE) requesting EPS bearer creation for APN #3 included in the received PDN Connectivity Request message or there is absent the linked user equipment (Linked UE) keeping the EPS Bearer already created for the APN #3.

That is, the MME #1 determines that it has first received, among the MMEs, the PDN Connectivity Request message for the corresponding APN (APN #3). Then, the MME #1 notifies this determination to the MME #2 managing the linked user equipment #2 using the update linked UE Notification message (S1202).

The expression of such a message as the update linked UE notification message is one example. Such a message may be represented as another terminology.

The notified determination is that the MME #1 has first received, among the MMEs, the PDN Connectivity Request message.

Then, the MME #1 transmits a normal or successful response message to the update linked user equipment notification message from the MME (in this embodiment, MME #2) to which the MME #1 has transmitted the update linked user equipment notification message (S1203).

The normal or successful response message may be represented as an Update Linked UE Answer message. Alternatively, the message may be represented as another message terminology.

Thereafter, the MME #1 requests the gateway (S-GW/P-GW) of session creation in the same way as the EPS session establishment procedure in FIG. 7.

The gateway may be a network entity, a network node, a core network node, etc., and may be expressed as a general terminology.

Second, the operation after the MME #1 has received a session establishment response message (or Create Session Response message) corresponding to the session establishment request message from the gateway will be described.

As already mentioned above, the MME #1 performs the default EPS Bearer Context Activation procedure with the user equipment #1 in the same manner as the EPS session establishment procedure of FIG. 7 (S1204).

At the same time as or before or after the Default EPS Bearer Context Activation procedure, the MME #1 transfers the EPS bearer-related information of the user equipment #1 related to the corresponding APN #3 to the MME #2 (S1205).

The EPS bearer-related information of the user equipment #1 may be included in the update linked EPS Bearer Notification message.

This message may be expressed as the update-linked EPS Bearer Notification message in one example. Alternatively, this message may be represented as another message terminology.

Then, the MME #1 receives a response message to the information transmitted in step S1205. The response message may also be expressed, as an example, Update Linked EPS Bearer Answer message. Alternatively, such a message may be represented as another message terminology.

The EPS Bearer-related information of the user equipment #1 may include the EPS Bearer identifier of the user equipment #1, the allocated IP address to the user equipment #1, the P-GW IP address thereto, and the like.

Upon receiving the EPS bearer-related information of the user equipment #1, the MME #2 stores therein the EPS bearer-related information of the user equipment #1 as received from the MME #1.

In FIG. 12, reference numeral 1220 denotes information about the user equipment #2 stored in the MME #2.

The information stored in the MME #2 includes information related to the user equipment #1 linked with the user equipment #2.

The information related to the linked user equipment #1 includes the user equipment #1, MME #1, APN #3, EPS Bearer #4, the IP address of the user equipment #1, the IP address of the GW, and the like as shown in FIG. 12.

Thirdly, the MME #2 operation, in which the MME #2 receives the PDN Connectivity Request message from the user equipment #2, is described in more detail.

The receiving operation of receiving the PDN Connectivity Request message from the user equipment #2 by MME #2 is later than the receiving operation of receiving the PDN Connectivity Request message from the user equipment #1 by MME #1.

When the MME #2 receives the PDN Connectivity Request message from the user equipment #2 (S1206), the MME #2 determines the absence or presence of the user equipment (Linked UE) linked with the UE #2.

Referring to FIG. 12, we may see that the user equipment #1 is present as the user equipment linked with the user equipment #2.

Then, the MME #2 determines whether there is a linked UE requesting EPS bearer creation for APN #3 included in the received PDN Connectivity Request message. Alternatively, the MME #2 determines the absence or presence of the linked UE keeping the EPS Bearer already created for the APN #3.

Referring to FIG. 12, it may be seen that the UE #1 is present as the linked UE requesting EPS bearer creation for APN #3 included in the received PDN Connectivity Request message or as the linked UE keeping the EPS Bearer already created for the APN #3.

Therefore, the MME #2 determines that it has not first received the PDN Connectivity Request message for the corresponding APN (APN #3) among the plurality of MMEs. Then, the MME #2 does not notify the MME #1 managing the user equipment #1 which is the Linked UE of the determination.

The determination indicates that MME #2 has received the PDN Connectivity Request message for APN #3.

Then, the MME #2 waits until it receives EPS bearer-related information (related to the user equipment #1) from the MME #1.

Upon receiving the EPS Bearer-related information from the MME #1, MME #2 requests the gateway (S-GW/P-GW) of the session creation in the same way as the EPS session establishment procedure in FIG. 7.

Here, the MME #2 includes the allocated IP address to the user equipment #1 and the P-GW IP address into the session creation request message, based on the information (EPS bearer-related information) received from the MME #1. Then, the MME #2 transmits the session creation request message to the gateway (S-GW/P-GW) (S1207) so that EPS Bearer may be created between P-GWs with the same IP address as the user equipment #1.

After the gateway receives the session creation request message in step S1207, the gateway applies the data boosting policy of the PCRF.

The gateway may include both an S-GW and a P-GW, and may mean either an S-GW or a P-GW.

When the gateway means S-GW or P-GW, the order of the data or message flow as described in the present disclosure is defined as the order from MME to S-GW and then from S-GW to P-GW. Alternatively, the flow order may be defined as a sequence from P-GW to S-GW and then from S-GW to MME.

Fourth, the MME #2 operation, in which the MME #2 receives a session creation response message corresponding to the session creation request message from the gateway, will be described in more detail.

The MME #2 performs the default EPS Bearer Context Activation procedure together with the user equipment #2 in the same manner as the EPS session establishment procedure of FIG. 7 (S1208).

Then, the MME #2 transfers the EPS bearer-related information of the user equipment #2 for the corresponding APN (APN #3) to the corresponding MME #1 (S1209).

The EPS Bearer-related information of the user equipment #2 may include the EPS Bearer identifier of the user equipment #2, and so on.

The EPS bearer-related information of the user equipment #2 may be included in the Update Linked EPS Bearer Notification message.

Further, the MME #1 transmits to the MME #2 a response message in response to the information received in step S1209. The response message may be included in the Update Linked EPS Bearer Answer message.

Thereafter, the MME #1 stores therein the EPS bearer-related information of the user equipment #2 received from the MME #2.

Table 1 shows one example of the information stored in each MME after building up the multi-paths for the user equipments in the user platform for data boosting according to the scheme of FIG. 12:

TABLE 1

| User equipment #1 information in MME #1 | User equipment #2 information in MME #2 |
|---|---|
| . . . | . . . |
| . . . | . . . |
| . . . | . . . |
| Information block on linked user equipment (Linked UE) {UE #2, MME #2, APN #3, EPS Bearer #7} | Information block on linked user equipment (Linked UE) {UE #1, MME #1, APN #3, EPS Bearer #4, UE IP address, GW IP address} |
| . . . | . . . |

The steps as shown in FIG. 12 do not indicate the order of operations that occur in the order corresponding to the drawing numbers. However, for ease of understanding, the steps are indicated using the drawing numbers. The operation sequence of the steps may be defined by referring to the examples related to FIG. 12.

Second Embodiment

The second embodiment provides another signaling method between MMEs by which the MMEs assign the same IP address to the user equipments for a new or additional APN when the MMEs corresponding to the UEs in the user platform are individually present in the core network.

That is, the second embodiment provides a method of granting authority to preferentially perform the PDN Connectivity Request of the user equipment based on the value of the MME identifier when the MMEs simultaneously receive a PDN Connectivity Request message for the new or additional APN from the user equipments respectively.

Figure 13:
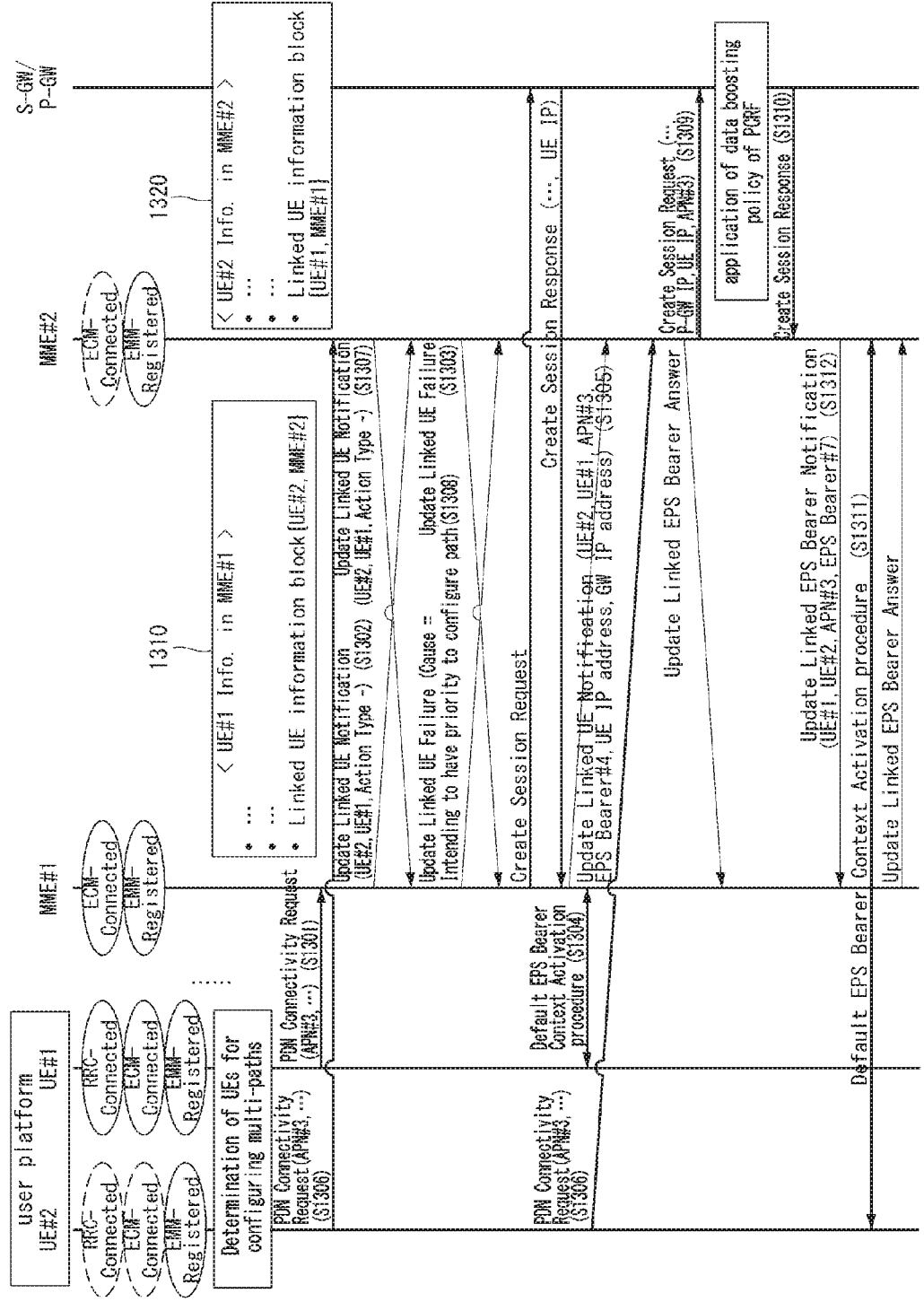

In FIG. 13, it is assumed that the MME #1 is given a priority right to perform the PDN Connectivity Request.

However, this is only one example. The MME #2 may be given priority authority to perform the PDN Connectivity Request. The principles of the disclosure as described below may be applied equally thereto.

FIG. 13 is a flow chart showing another example of a method for constructing the multi-paths for data boosting as proposed according to the present disclosure.

Before referring to FIG. 13, we assume the following four configurations:

(1) The number of communication devices in the user platform shown in FIG. 9, where the proposed method may be applied according to the present disclosure, is two.

(2) The user equipments are managed by different MMEs. That is, the user equipment #1 is managed by MME #1, and the user equipment #2 is managed by MME #2.

(3) The MME #2 receives the PDN Connectivity Request message of the user equipment #2, and then notifies the MME #1 of the reception of the PDN Connectivity Request message. Then, the MME #2 recognizes that the user equipment #1 has subsequently transmitted a PDN Connectivity Request message to MME #1.

(4) Under the assumption of (3), when the identifier value of MME #2 is larger than the identifier value of MME #1 transmitting Update Linked UE Notification, the MME #2 transmits Update Linked UE Answer to MME #1 with the smaller MME identifier value.

In contrast, when the identifier value of MME #1 is smaller than the identifier value of MME #2, the MME #1 transmits an Update Linked UE failure to the MME #2 having a larger MME identifier value.

That is, FIG. 13 shows one example where the MME with the lowest identifier value among the MMEs receiving the PDN Connectivity Request message concurrently from the user equipments respectively has the right to preferentially perform the PDN request of the user equipment.

However, this is one example. Alternatively, the MME having the largest MME identifier value may be authorized to preferentially perform the PDN request of the user equipment.

Hereinafter, a method will be described, with reference to FIG. 13, for constructing the multi-paths for data boosting by the MME #1 preferentially performing the PDN Connectivity Request of the user equipment when the MME #1 and MME #2 simultaneously receive a PDN Connectivity Request message from the user equipments respectively.

In FIG. 13, the MME identifier sizes between MMEs are compared with each other to establish criteria used for granting a priority to perform the PDN Connectivity Request. However, the present disclosure is not limited thereto. Other criteria may be used for granting a priority to perform the PDN Connectivity Request.

As shown in FIG. 13, it is assumed as in FIG. 12 that there are multiple MMEs (MME #1, and MME #2) respectively associated with the user equipments in the core network.

For the convenience of understanding, operations of respective MMEs in order to establish the multi-paths will be individually illustrated.

The contents related to S1301 and 1310 in FIG. 13 are the same as those related to S1201 and 1210 in FIG. 12, and, thus, specific examples thereof will be omitted. The difference between the method of FIG. 13 and the method of FIG. 12 will be mainly described below.

Further, in FIG. 13, it is assumed that the identifier of MME #1 is smaller than the identifier of MME #2.

The identifier of the MME may be the index value of the MME ID, and so on.

First, the MME #1 determines the absence or presence of the linked user equipment (Linked UE) based on the PDN Connectivity Request message as received from the user equipment #1.

Referring to FIG. 13, we may see that the user equipment #2 is the user equipment linked with the user equipment #1.

Next, the MME #1 determines whether there is a linked user equipment (Linked UE) requesting EPS bearer creation for APN #3 included in the received PDN Connectivity Request message. Alternatively, the MME #1 determines whether there is a linked user equipment (Linked UE) keeping the EPS Bearer already created for the APN #3.

Referring to FIG. 13, the MME #1 determines that there is absent the linked user equipment (Linked UE) requesting EPS bearer creation for APN #3 included in the received PDN Connectivity Request message or there is absent the linked user equipment (Linked UE) keeping the EPS Bearer already created for the APN #3.

That is, the MME #1 determines that it has first received, among the MMEs, the PDN Connectivity Request message for the corresponding APN (APN #3). Then, the MME #1 notifies this determination to the MME #2 managing the linked user equipment #2 (S1302).

Specifically, the MME #1 notifies this determination to the MME #2 managing the linked user equipment #2 using the update linked UE Notification message (S1302).

The expression of such a message as the update linked UE notification message is one example. Such a message may be represented as another terminology.

Thereafter, the MME #2 transmits a normal or a successful response message to the MME #1 having an MME identifier smaller than that of the MME #2 (S1303).

The normal or successful response message may be represented as an Update Linked UE Answer message. Alternatively, the message may be represented as another message terminology.

Before transmitting the successful response message, the MMEs may perform a procedure to compare the MME identifiers with each other.

That is, each MME checks the source address contained in the header of the data or the message as transmitted from the other MME, and knows the identifier of the other MME.

That is, the MME #1 may know the identifier of the MME #2 using the source address included in the message of the MME #2. Then, The MME #1 compares the identifier of the MME #2 with its identifier.

Thereafter, upon receipt of the normal or successful response message from the MME #2, the MME #1 requests session creation to the gateway (S-GW/P-GW) in the same manner as the EPS session establishment procedure of FIG. 7.

Next, the operation after the MME #1 has received a session establishment response message (or Create Session Response message) corresponding to the session establishment request message from the gateway (S-GW/P-GW) will be described.

As already mentioned above, the MME #1 performs the default EPS Bearer Context Activation procedure with the user equipment #1 in the same manner as the EPS session establishment procedure of FIG. 7 (S1304).

Thereafter, the MME #1 transfers the EPS bearer-related information of the user equipment #1 related to the corresponding APN #3 to the MME #2 (S1305).

The EPS Bearer-related information of the user equipment #1 may include the EPS Bearer identifier of the user equipment #1, the allocated IP address to the user equipment #1, the P-GW IP address thereto, and the like.

Upon receiving the EPS bearer-related information of the user equipment #1, the MME #2 stores therein the EPS bearer-related information of the user equipment #1 as received from the MME #1.

Next, the MME #2 operation, in which the MME #2 receives the PDN Connectivity Request message from the user equipment #2, is described in more detail.

When the MME #2 receives the PDN Connectivity Request message from the user equipment #2 (S1306), the MME #2 determines the absence or presence of the user equipment (Linked UE, that is, UE #1) linked with the UE #2 based on the message.

Referring to FIG. 13, we may see that the user equipment #1 is present as the user equipment linked with the user equipment #2.

Then, the MME #2 determines whether there is a linked UE requesting EPS bearer creation for APN #3 included in the received PDN Connectivity Request message. Alternatively, the MME #2 determines the absence or presence of the linked UE keeping the EPS Bearer already created for the APN #3.

Since the MME #1 and MME #2 simultaneously receive the PDN Connectivity Request messages from the user equipments respectively, it may be seen that there is absent the linked UE requesting EPS bearer creation for APN #3 included in the received PDN Connectivity Request message or the linked UE keeping the EPS Bearer already created for the APN #3.

That is, since the MME #2 determines that it has first received the PDN Connectivity Request message for the corresponding APN (APN #3) among the plurality of MMEs, the MME #2 may notify the MME #1 managing the user equipment #1 which is the Linked UE of the determination (S1307).

Thereafter, when the MME #1 receives a message informing reception of the PDN Connectivity Request message, that is, Update linked UE Notification message from the MME #2 in step S1307, the MME #1 transmits a failure response message to the MME #2 having an MME identifier value larger than its own MME identifier (S1308).

The failure response message may be represented as an Update Linked UE Failure message. This expression is one example. The message may be represented as another message terminology.

That is, the failure response message may be interpreted as the MME #1 having the right or priority to preferentially perform the PDN Connectivity Request.

Thereafter, when the MME #2 receives the failure response message from the MME #1, the MME #2 waits until it receive the EPS Bearer-related information of the user equipment #1 from the MME #1.

Thereafter, upon receiving the EPS bearer-related information for the user equipment #1 from the MME #1, the MME #2 requests session creation to the gateway in the same manner as the EPS session establishment procedure in FIG. 7 In step S1309.

Here, the MME #2 includes the allocated IP address to the user equipment #1 and the P-GW IP address into the session creation request message, based on the information (EPS bearer-related information) received from the MME #1. Then, the MME #2 transmits the session creation request message to the gateway (S-GW/P-GW) so that EPS Bearer may be created between P-GWs with the same IP address as the user equipment #1.

Thereafter, the MME #2 receives a Create Session Response message in response to the session creation request message from the gateway (S1310).

Next, the procedure will be described after the MME #2 has received the session creation response message.

The MME #2 performs the default EPS Bearer Context Activation procedure together with the user equipment #2 in the same manner as the EPS session establishment procedure of FIG. 7 (S1311).

Further, the MME #2 transmits to the MME #1 the EPS Bearer-related information (for example, the EPS Bearer identifier of the user equipment #2) of the user equipment #2 for the corresponding APN (APN #3) (S1312).

The MME #1 transmits an Update Linked EPS Bearer Answer message to the MME #2 in response to receiving the Update Linked EPS Bearer Notification message in step S1312.

The expression of the messages as the Update Linked EPS Bearer Notification message and the Update Linked EPS Bearer Answer message is one example. The messages may be represented as other message terminologies.

Thereafter, the MME #1 stores therein the EPS bearer-related information of the user equipment #2 received from the MME #2.

The steps as shown in FIG. 13 do not indicate the order of operations that occur in the order corresponding to the drawing numbers. However, for ease of understanding, the steps are indicated using the drawing numbers. The operation sequence of the steps may be defined by referring to the examples related to FIG. 13.

Third Embodiment

The third embodiment provides a method for setting the same IP address for the multiple user equipments for the new or additional APN when there is only a single MME in the user platform, that is, when a single MME in the core network manages a large number of the user equipments in the user platform.

That is, the third embodiment provides a method for constructing the multi-paths for data boosting when a single MME that manages all of the user equipments in the user platform simultaneously receives from the user equipments a PDN Connectivity Request message for the new or additional APN.

Figure 14:
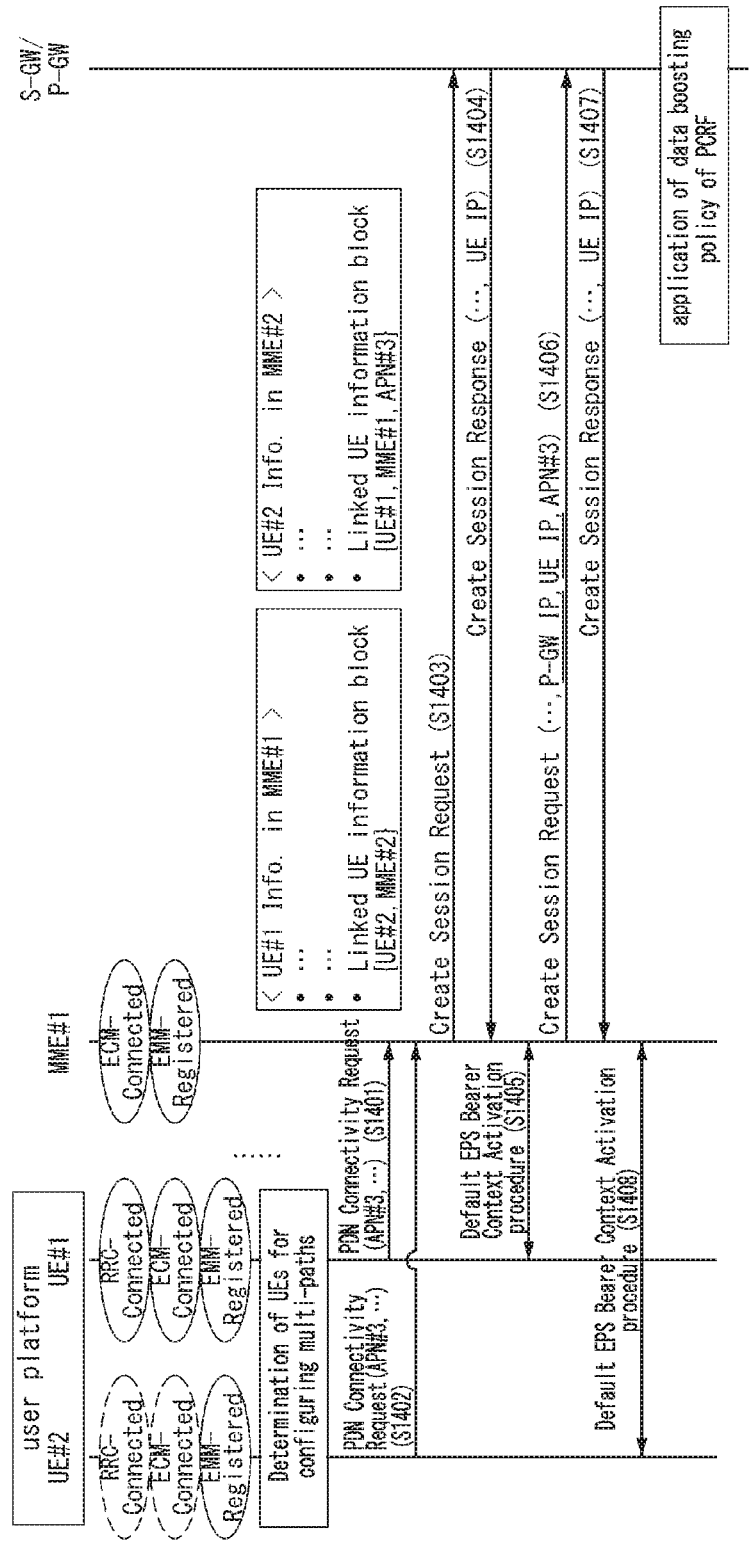
FIG. 14 is a flow chart showing another example of a method for configuring multi-paths for data boosting using multiple user equipments as proposed in accordance with the present disclosure.

FIG. 14 is a flow chart showing still another example of a method for constructing the multi-paths for data boosting as proposed according to the present disclosure.

FIG. 14 assumes the following three configurations:

(1) The number of user equipment in the user platform is two, as shown in FIG. 14, where the proposed method may be applied according to the present disclosure.

(2) The user equipments are being managed by the same MME. That is, both the user equipment #1 and the user equipment #2 are managed by the same MME #1.

(3) It is assumed that the MME #1 first receives the PDN Connectivity Request message of the user equipment #1.

Referring to FIG. 14, one example where a single MME that manages a large number of the user equipments in a single user platform is present in the core network is described The MME #1 receives the PDN Connectivity Request message from each of the user equipment #1 and the user equipment #2 (S1401, S1402).

As previously assumed, the MME #1 first receives the PDN Connectivity Request message from the user equipment #1.

The PDN Connectivity Request message includes identification information for the new or additional APN.

In the case of FIG. 14, it may be known that the new or additional APN is APN #3.

Thereafter, the MME #1 transmits a session creation request message for the user equipment #1 to the gateway (S-GW/P-GW) (S1403).

Thereafter, the MME #1 receives a session creation response message from the gateway in response to the session creation request message (S1404).

Thereafter, the MME #1 performs the default EPS Bearer Context Activation procedure together with the user equipment #1 in the same manner as the EPS session establishment procedure of FIG. 7 (S1405).

Subsequently, when the MME #1 receives the PDN Connectivity Request message from the user equipment #2, the MME #1 determines the absence or presence of the user equipment (Linked UE) linked with the user equipment #2.

Because the MME #1 manages both the user equipment #1 and the user equipment #2, the MME #1 may directly check the link relationship between the user equipments.

In FIG. 14, the user equipment #1 is linked to the user equipment #2.

Next, the MME #1 determines whether there is a linked user equipment (Linked UE) requesting EPS bearer creation for APN #3 included in the received PDN Connectivity Request message received from the UE #2. Alternatively, the MME #1 determines whether there is a linked user equipment (Linked UE) keeping the EPS Bearer already created for the APN #3.

Referring to FIG. 14, it may be seen that since the single MME receives the PDN Connectivity Request message from each of the user equipment, the MME #1 determines that the UE #1 has either already requested the EPS bearer creation for APN #3 or keeps an EPS bearer already created for APN #3.

Therefore, the MME #1 waits until it receives a session creation response message for the user equipment #1 from the gateway.

Thereafter, when the MME #1 receives a session creation response message from the gateway in step S1404, the MME #1 requests session creation for the user equipment #2 to the gateway in the same manner as the EPS session establishment procedure in FIG. 7 (S1406).

Here, when the MME #1 transmits a session creation request message for the user equipment #2, the MME #1 includes the allocated IP address to the user equipment #1 and the P-GW IP address into the session creation request message and transmits the message to the gateway. This allows the EPS bearer to be created between P-GWs for the user equipment #2 using the same IP address as the user equipment #1.

Thereafter, the MME #1 receives a session creation response message from the gateway in response to the session creation request message (S1407).

Thereafter, the MME #1 performs the default EPS Bearer Context Activation procedure together with the user equipment #2 in the same manner as the EPS session establishment procedure of FIG. 7 (S1408).

The steps as shown in FIG. 14 do not indicate the order of operations that occur in the order corresponding to the drawing numbers. However, for ease of understanding, the steps are indicated using the drawing numbers. The operation sequence of the steps may be defined by referring to the examples related to FIG. 12.

Figure 15:
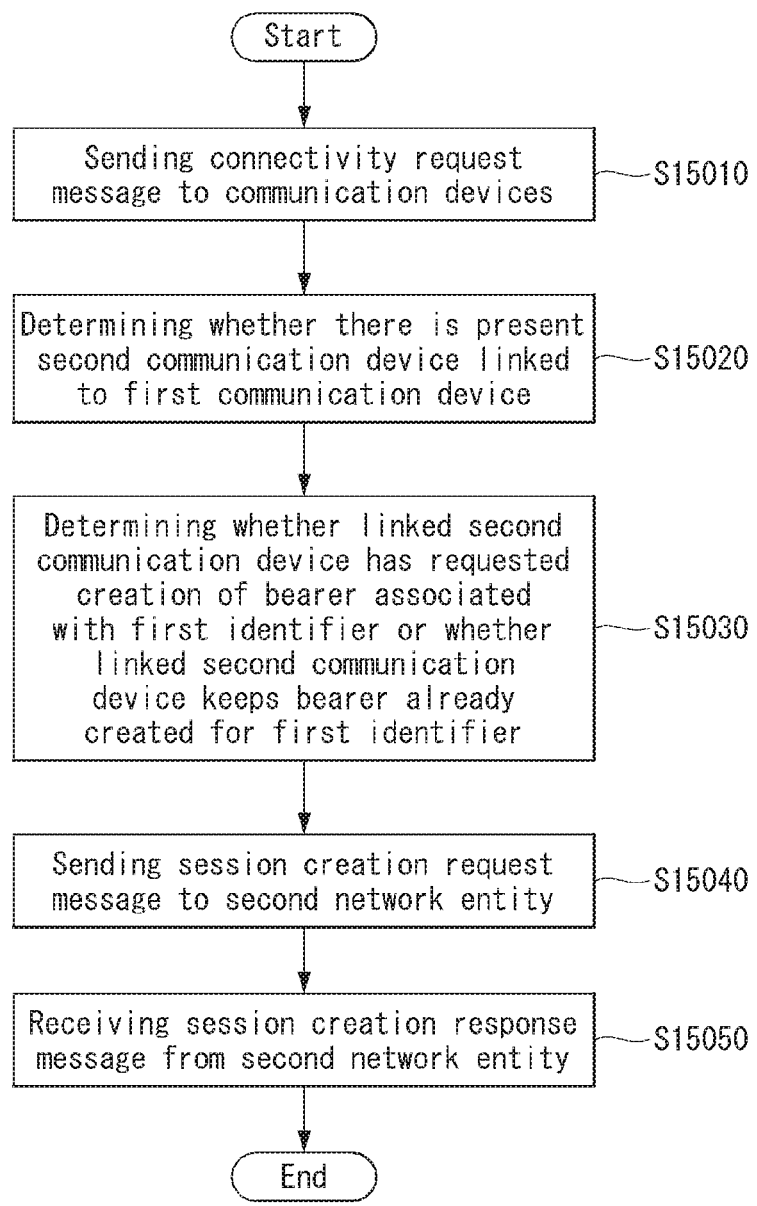
FIG. 15 is a flowchart showing one example of a method for configuring multi-paths for data boosting using multiple communication devices in a user platform as proposed in accordance with the present disclosure.

FIG. 15 is a flowchart showing one example of the proposed method according to the present disclosure for constructing multi-paths for data boosting using multiple communication devices in the user platform.

Specifically, FIG. 15 shows one example of the operation of a network entity (MME) for preferentially processing PDN Connectivity Requests received from a communication device in the user platform.

First, the first network entity receives from the at least one communication devices a Connectivity Request message for requesting attach to the core network (CN) for data transmission/reception (S1510).

The connectivity request message may contain at least one of a first identifiers identifying the core network with which the attach is requested, a second identifier identifying the second communication device linked to the first communication device transmitting the Connectivity Request message, and a third identifier that identifies the first network entity that manages the first communication device.

Here, the first communication device represents the communication device first performing attach to the core network among the communication devices included in the wireless device. In the preceding examples, the first communication device represents the S-UE or the user equipment #1.

The second communication device represents a communication device that attaches with the core network after the first communication device has attached with the CN. In the previous examples, the second communication device represents the V-UE or the user equipment #2.

Further, the first communication device may have a connected state, while the second communication device may have a connected state or an idle state.

The first network entity refers to the MME that manages the first communication device and is in the connected state.

Further, as we have seen in FIG. 9 and FIG. 10, the first communication device and the second communication device use or share a single application layer, a single transport layer, and a single network layer.

Further, the core network may be an application packet network (APN), and the APN may be expressed as an Access Point Name.

Thereafter, the first network entity determines based on the received Connectivity Request message whether a second communication device linked with the first communication device exists (S1520).

When the result of the determination in step S1520 indicates that there is present the second communication device linked to the first communication device, the first network entity additionally determines whether the linked second communication device has requested creation of the bearer associated with the first identifier, or whether the linked second communication device keeps the bearer already created for the first identifier (S1530).

Thereafter, the first network entity transmits a session creation request message to the second network entity to create a session associated with the first identifier (S1540).

The second network entity represents a gateway. The gateway may include both S-GW and P-GW, or may only refer to S-GW or P-GW.

Thereafter, the first network entity receives a session creation response message from the second network entity in response to the session creation request message (S1550).

Thereafter, the first network entity performs the bearer context activation procedure together with the at least one communication devices (S1560).

The steps S1510 to S1560 of FIG. 15 may equally be applied to the first to third embodiments as described above. In the following, the disclosure that may be implemented in each embodiment will be further described.

When network entities (for example, MMEs) that manage the first communication device and the second communication device are different, the S1540 step may be performed via the following procedure.

That is, the first network entity (for example, MME #1) that manages the first communication device transmits to the second network entity the first session creation request message associated with the first communication device. The third network entity (for example, MME #3) that manages the second communication device may transmit to the second network entity a second session creation request message associated with the second communication device.

Similarly, when the network entities (for example, MMEs) that manage the first communication device and the second communication device are different, the S1550 step may be performed via the following procedure.

The first network entity may receive a first session response message to the first session creation request message from the second network entity. The third network entity may receive a second session response message to the second session creation request message from the second network entity.

When it is indicated from the determination result in step S1530 that the linked second communication device did not request the creation of the bearer associated with the first identifier, or the second communication device did not keep a bearer already created for the first identifier, the first network entity transmits a control message informing receipt of the connection request message to the third network entity that manages the linked second communication device.

The control message may contain at least one of the first identifier, the second identifier, a fourth identifier for identifying the communication device managed by the first network entity, and action type information indicating that the control message is intended to inform reception of the Connectivity Request message.

Subsequently, the first network entity may receive a response message to the control message from the third network entity.

Subsequently, when the first network entity receives the first session creation response message from the second network entity, the first network entity may transmit, to the third network entity, bearer-related information as configured for the first communication device and the first identifier.

The bearer-related information may include at least one of a bearer identifier identifying a bearer configured in the first communication device, IP address assigned to the first communication device or P-GW (PDN Gateway) IP address.

Here, when the first network entity receives the response message to the control message from the third network entity, the first network entity may determine the priority of the session establishment request for the first identifier based on the received response message.

Similarly, the third network entity may determine the priority of the session establishment request for the first identifier.

Specifically, the step of determining the priority may be performed by the first network entity comparing the identifier of the third network entity contained in the received response message with the identifier of the first network entity.

Subsequently, the priority of the session establishment request is determined based on an ascending or descending order of the identifiers of the network entities.

Figure 16:
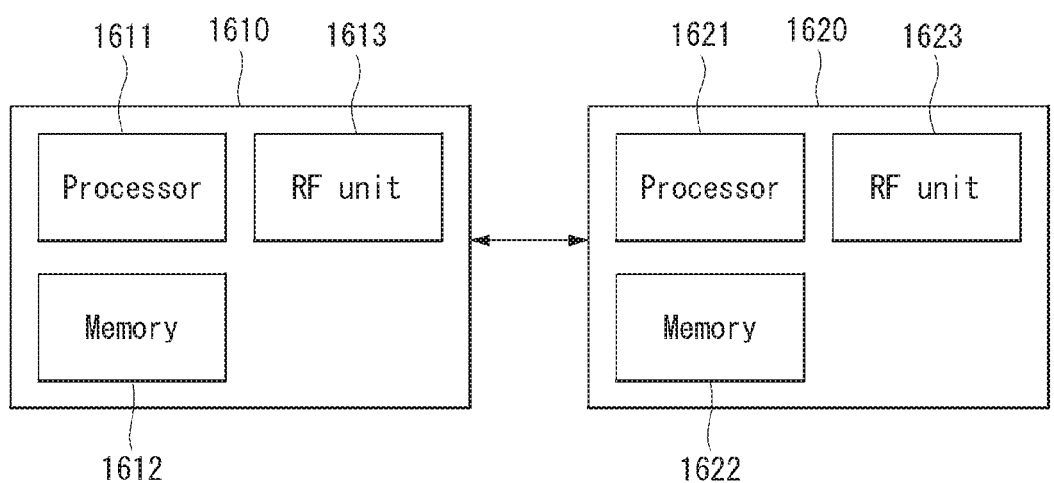
FIG. 16 shows one example of an internal block diagram of a wireless device to which the present invention may be applied.

FIG. 16 shows one example of an internal block diagram of a wireless device to which the present invention may be applied.

Here, the wireless device may be referred to as a user platform, and the communication device may be referred to as a terminal, a communication modem, or the like.

As shown in FIG. 16, the eNB 1610 and the UE 1620 include communication units (transmitting/receiving units, RF units, 1613 and 1623), processors 1611 and 1621, and memories 1612 and 1622.

The eNB and the UE may further input units and output units.

The communication units 1613 and 1623, the processors 1611 and 1621, the input units, the output units, and the memories 1612 and 1622 are operatively connected with each other in order to conduct the methods as proposed in the present disclosure.

The communication units (transmitting/receiving units or RF units, 1613 and 1623), when receiving information created from a PHY (Physical Layer) protocol, transfer the received information through RF (Radio-Frequency) spectrums and conduct filtering and amplification, then transmit it through antennas. Further, the communication units transfer RF (Radio Frequency) signals received through the antennas to bands available to be processed in the PHY protocol and perform filtering.

In addition, the communication units may also include the functions of switches to switch transmitting and receiving functions.

The processors 1611 and 1621 implement functions, procedures, and/or methods as proposed in the present disclosure. The layers of radio interface protocols may be implemented by the processors.

The processors may be represented as control parts, controllers, control units, or computers.

The memories 1612 and 1622 are connected with the processors and store protocols or parameters for performing the function, procedure and/or method proposed in the present disclosure.

The processors 1611 and 1621 may include an application-specific integrated circuit (ASIC), a separate chipset, a logic circuit, and/or a data processing unit. The memory may include a read-only memory (ROM), a random access memory (RAM), a flash memory, a memory card, storage medium, and/or other storage devices. The communication unit may include a base-band circuit for processing a radio signal. When the embodiment is implemented in software, the aforementioned methods may be implemented with a module (process, function, etc.) for performing the aforementioned functions.

The module may be stored in the memory and may be performed by the processor. The memory may be located inside or outside the processor, and may be coupled to the processor by using various well-known means.

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by those ordinary skilled in the art, designing recording media readably by a computer recording programs to execute the above-described embodiments also belongs to the scope of the present invention.

The method for direction-based searching a device proposed in the present disclosure, rather than limited to the configurations and methods according to the above-described embodiments, may be configured so that all or some of the embodiments may be selectively combined with each other to allow for various variations or modifications.

Meanwhile, the method for direction-based searching a device of the present disclosure may be implemented as codes that are readable by a recording medium readable by a process provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet. Further, the recording media readable by the processor may be distributed to computer systems connected with each other via a network, and processor readable codes may be stored and executed in a distributing manner.

In addition, the preferred embodiments have been depicted and described so far, but the present disclosure is not limited to the specific embodiment described above. It is understood that various modifications are available by those skilled in the dart without departing from the technical feature of the present invention claimed in claims, and such modifications should not be individually understood from the technical spirit and prospect of the present invention.

Further, both of the method invention and the device invention are described in the present disclosure, and both of the invention may be applied complementarily with each other as occasion demands.

INDUSTRIAL APPLICABILITY

The data boosting method in the wireless communication system according to the present invention which may be applied to the 3GPP LTE/LTE-A system has been mainly described above. The present disclosure is not limited to this. The data boosting method in the wireless communication system according to the present invention may be equally applied to various wireless communication systems including the 5G system, and the like in addition to the 3GPP LTE/LTE-A system.

What is claimed is:

1. A method for transmitting and receiving data, by a first network entity, using a plurality of communication devices included in a single wireless device in a wireless communication system, the method comprises:
   receiving from one or more communication device a connectivity request message for requesting an attach to a core network for transmission and reception of the data, wherein the connectivity request message includes at least one of:
   a first identifier identifying the core network with which the attach is requested;
   a second identifier identifying a second communication device linked to a first communication device transmitting the connectivity request message; or
   a third identifier identifying the first network entity managing the first communication device;
   determining based on the received connectivity request message whether there is the second communication device linked to the first communication device; and
   when there is the second communication device linked to the first communication device, determining:
   whether the linked second communication device has requested creation of a bearer associated with the first identifier; or
   whether the linked second communication device keeps a bearer already created for the first identifier.

2. The method of claim 1, wherein the method further comprises:
   transmitting a session creation request message to a second network entity to create a session associated with the first identifier;
   receiving a session creation response message from the second network entity in response to the session creation request message; and
   performing a bearer context activation procedure with the one or more communication device.

3. The method of claim 2, wherein transmitting the session creation request message to the second network entity includes:
   transmitting a first session creation request message associated with the first communication device to the second network entity; and
   transmitting a second session creation request message associated with the second communication device to the second network entity.

4. The method of claim 3, wherein receiving the session creation response message from the second network entity includes:
receiving a first session response message to the first session creation request message from the second network entity; and
receiving a second session response message to the second session creation request message from the second network entity.

5. The method of claim 4, wherein the method further comprises:
when the first network entity receives the first session creation response message from the second network entity, transmitting, to the third network entity, bearer-related information configured for the first communication device and the first identifier.

6. The method of claim 5, wherein the bearer-related information includes at least one of:
a bearer identifier identifying a bearer configured for the first communication device;
an IP address assigned to the first communication device; or
an IP address of a P-GW (PDN gateway).

7. The method of claim 2, wherein the first network entity is a mobile management entity (MME),
wherein the second network entity is a gateway (GW).

8. The method of claim 1, wherein the method further comprises:
when the linked second communication device has not requested the creation of the bearer associated with the first identifier; or
when the linked second communication device does not keep the bearer already created for the first identifier,
transmitting a control message informing the receipt of the connectivity request message to a third network entity managing the linked second communication device.

9. The method of claim 8, wherein the control message includes at least one of:
the first identifier;
the second identifier;
a fourth identifier identifying a communication device managed by the first network entity; or
action type information indicating that the control message is intended to inform the reception of the connectivity request message.

10. The method of claim 8, wherein the method further comprises receiving a response message to the control message from the third network entity.

11. The method of claim 10, wherein the method further comprises:
when the first network entity receives a response message to the control message from the third network entity, determining a priority of a session establishment request for the first identifier based on the received response message.

12. The method of claim 11, wherein determining the priority includes comparing a identifier of the third network entity contained in the received response message with the identifier of the first network entity,
wherein the priority of the session establishment request is determined to be small or large in the identifiers of the network entities.

13. The method of claim 1, wherein the first communication device is a communication device to perform a first attach to the core network among the communication devices included in the wireless device;
wherein the second communication device is a communication device to perform a subsequent attach to the core network after the first attach among the communication devices included in the wireless device.

14. The method of claim 13, wherein the first communication device is in a connected state,
wherein the second communication device is in a connected state or idle state,
wherein the first network entity is in a connected state.

15. The method of claim 1, wherein the first communication device and the second communication device share a single application layer, a single transport layer, and a single network layer.

16. The method of claim 1, wherein the core network is an application packet network (APN).

17. A first network entity for transmitting and receiving data using a plurality of communication devices included in a single wireless device in a wireless communication system, the first network entity comprises:
a transmission and reception unit configured for transmitting and receiving a radio signal; and
a processor functionally connected to the transmission and reception unit, wherein the processor is configured for:
receiving from one or more communication device a connectivity request message for requesting an attach to a core network for transmission and reception of the data, wherein the connectivity request message includes at least one of:
a first identifier identifying the core network with which the attach is requested;
a second identifier identifying a second communication device linked to a first communication device transmitting the connectivity request message; or
a third identifier identifying the first network entity managing the first communication device;
determining based on the received connectivity request message whether there is the second communication device linked to the first communication device; and
when there is the second communication device linked to the first communication device, determining:
whether the linked second communication device has requested creation of a bearer associated with the first identifier; or
whether the linked second communication device keeps a bearer already created for the first identifier.

* * * * *